(12) United States Patent
Ueda

(10) Patent No.: US 8,221,845 B2
(45) Date of Patent: Jul. 17, 2012

(54) CELLULOSE RESIN FILM AND METHOD FOR PRODUCING THE SAME

(75) Inventor: Tadashi Ueda, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 1167 days.

(21) Appl. No.: 12/066,202

(22) PCT Filed: Sep. 5, 2006

(86) PCT No.: PCT/JP2006/317942
§ 371 (c)(1),
(2), (4) Date: Mar. 7, 2008

(87) PCT Pub. No.: WO2007/029848
PCT Pub. Date: Mar. 15, 2007

(65) Prior Publication Data
US 2009/0169908 A1    Jul. 2, 2009

(30) Foreign Application Priority Data

Sep. 7, 2005   (JP) ................. 2005-259710

(51) Int. Cl.
*C08J 5/18* (2006.01)
(52) U.S. Cl. ............ 427/374.1; 427/415; 428/534
(58) Field of Classification Search ............ 427/374.1, 427/415; 428/534
See application file for complete search history.

(56) References Cited

U.S. PATENT DOCUMENTS

| | | | | |
|---|---|---|---|---|
| 2,681,294 | A * | 6/1954 | Beguin | 430/523 |
| 7,968,019 | B2 * | 6/2011 | Murakami | 264/2.7 |
| 2002/0094444 | A1 * | 7/2002 | Nakata et al. | 428/480 |
| 2005/0150426 | A1 * | 7/2005 | Hashimoto et al. | 106/170.21 |
| 2006/0078754 | A1 * | 4/2006 | Murakami et al. | 428/532 |
| 2008/0057227 | A1 * | 3/2008 | Suzuki et al. | 428/1.1 |

FOREIGN PATENT DOCUMENTS

| | | |
|---|---|---|
| CN | 1381346 A | 11/2002 |
| JP | 2000173044 A | 6/2000 |
| JP | 2000238194 A | 9/2000 |
| JP | 2002311240 A | 10/2002 |
| JP | 2002337173 A | 11/2002 |
| JP | 2003315551 A | 11/2003 |
| JP | 2005178194 A | 7/2005 |
| WO | 9963001 A1 | 12/1999 |

* cited by examiner

*Primary Examiner* — Leszek Kiliman
(74) *Attorney, Agent, or Firm* — Sughrue Mion, PLLC

(57) ABSTRACT

There is provided a method for producing a cellulose resin film, with which the deterioration of the entire film and the occurrence of die lines can be prevented. The method for producing a cellulose resin film, including the steps of: discharging two cellulose resins A and B molten in the respective extruders in the form of an A/B/A three-layer sheet from a die upon a support by co-extrusion; and cooling and solidifying the sheet-shaped molten resin into a film, wherein the resin A, which forms a pair of outer layers of the A/B/A three-layer sheet, has a number average molecular weight smaller than that of the resin B, which forms the inner layer of the A/B/A three-layer sheet, and the resin A has a number average molecular weight of 20,000 or more and 50,000 or less, and the resin B has a number average molecular weight of 30,000 or more and 100,000 or less.

13 Claims, 6 Drawing Sheets

FIG.6

| | OUTSIDE LAYER NUMBER OF AVERAGE MOLECULAR WEIGHT | INSIDE LAYER NUMBER OF AVERAGE MOLECULAR WEIGHT | RESISTANCE | DIE | LIP LAND LENGTH | WIDTH OF OUTSIDE LAYER/INSIDE LAYER (TO EXPAND OUTSIDE LAYER) | SURFACE ROUGHNESS (Ra) OF MID PORTION | SURFACE ROUGHNESS (Ra) OF EDGE PORTION |
|---|---|---|---|---|---|---|---|---|
| EXAMPLE 1 | 20,000 | 100,000 | PRESENT | MANIFOLD | 100mm | 100% | 0.01 μm | 0.01 μm |
| EXAMPLE 2 | 20,000 | 100,000 | PRESENT | FEED BLOCK | 100mm | 90% | 0.03 μm | 2.3 μm |
| EXAMPLE 3 | 20,000 | 100,000 | ABSENT | FEED BLOCK | 100mm | 80% | 0.03 μm | 2.5 μm |
| EXAMPLE 4 | 20,000 | 100,000 | PRESENT | MANIFOLD | 3mm | 70% | 0.02 μm | 2.8 μm |
| COMPARATIVE EXAMPLE 1 | 80,000 | 100,000 | PRESENT | FEED BLOCK | 100mm | 95% | 3 μm | 3 μm |
| COMPARATIVE EXAMPLE 2 | 80,000 | 100,000 | PRESENT | MANIFOLD | 100mm | 88% | 2 μm | 3.1 μm |

CELLULOSE RESIN FILM AND METHOD FOR PRODUCING THE SAME

TECHNICAL FIELD

The present invention relates to a cellulose resin film and a method for producing the same, in particular, to a method for producing a cellulose resin film, such as cellulose acylate film, for use in liquid crystal display devices.

BACKGROUND ART

There have been increasing demands in recent years for cellulose resin films, such as a cellulose acylate film, as optical materials for protective film of sheet polarizer or optical compensation film of retardation plate in liquid crystal displays.

Processes for forming a cellulose resin film can be classified into two large categories: solution film forming process, and melt film forming process. The solution film forming process is a process in which a dope of cellulose resin in a solvent is cast from a die upon support(s), for example, cooling drum(s) into a film, while the melt film forming process is a process in which a cellulose resin is molten in an extruder and the molten resin is extruded from a die upon support(s), for example, cooling drum(s) into a film. The cellulose resin films formed by these processes are usually stretched in the longitudinal direction (lengthwise direction) and in the transverse direction (widthwise direction) so that it develops in-plane retardation (Re) and across-the-thickness retardation (Rth), and such stretched films are used as a retardation film for liquid crystal display devices to achieve a wider viewing angle in such displays (e.g. Japanese Patent Laid-Open Nos. 2002-311240 and 2003-315551).

Of the above described two film forming processes, the melt film forming process is an environmentally superior process, because it does not need a solvent drying step.

DISCLOSURE OF THE INVENTION

However, in the solution film forming process, resin is kept at high temperatures, and therefore, when the process is used for forming a cellulose resin film, which is susceptible to deterioration, die lines can sometimes occur in the resultant film, due to the deterioration of the resin, thereby lowering the optical characteristics of the film.

The present invention has been made in the light of the above described circumstances. Accordingly, an object of the present invention is to provide a method for producing a cellulose resin film, as a highly functional film for optical applications, which can suppress the occurrence of non-uniformity of optical characteristics in the film.

According to a first aspect of the present invention, to attain the aforementioned object, a method for producing a cellulose resin film, comprising the steps of: discharging two cellulose resins A and B molten in respective extruders in the form of an A/B/A three-layer sheet from a die upon a support by co-extrusion; and cooling and solidifying the sheet-shaped molten resin into a film, wherein the resin A, which forms a pair of outer layers of the A/B/A three-layer sheet, has a number average molecular weight smaller than that of the resin B, which forms the inner layer of the A/B/A three-layer sheet, and the resin A has a number average molecular weight of 20,000 or more and 50,000 or less, and the resin B has a number average molecular weight of 30,000 or more and 100,000 or less.

Generally, a cellulose resin used for optical films has a large number average molecular weight, and thus, it is susceptible to decomposition during its melting. After tremendous research effort toward solving the above described problem, the present inventor has found that the deterioration of a cellulose resin film can be prevented by providing cellulose resin, which is less susceptible to decomposition, for the outer layer of cellulose resin, which is susceptible to decomposition, whereby the occurrence of die lines in the film can be suppressed.

The first aspect is a method for producing a three-layer cellulose resin film, comprising the steps of: discharging two cellulose resin molten in the respective extruders in the form of a sheet from a die upon a cooling support by co-extrusion; and cooling and solidifying the sheet-shaped molten resin into a three-layer film, wherein the resin forming the outer layers of the film has a number average molecular weight smaller than that of the resin forming the inner layer of the same. Thus, the cellulose resin forming the inner layer, which is essential for the optical characteristics of the film but susceptible to deterioration, is protected by the cellulose resin forming the outer layers, which has a number average molecular weight smaller than that of the cellulose resin forming the inner layer, and therefore less susceptible to deterioration, whereby the deterioration of the entire film and the occurrence of die lines in the film can be prevented.

The reason for using a cellulose resin having a number average molecular weight of 20,000 of more for the outer layers is that generally cellulose resin having a number average molecular weight of 30,000 to 100,000 is used as a material for the single-layer cellulose resin film, and if the number average molecular weight of the cellulose resin used for the outer layers is less than 20,000, the adhesion of the outer layers to the inner layer becomes poor, and besides, there is created a difference in flowability between the cellulose resin of the outer layers and that of the inner layer. And the reason for using a cellulose resin having a number average molecular weight of 50,000 of less for the outer layers is that if the number average molecular weight of the cellulose resin used for the outer layers is more than 50,000, the surface of the film deteriorates and making up the cellulose film of more than one layer does not give the desired effect. The number average molecular weight can be obtained by calculating the sum of the products of the molecular weight and the number of the molecules using a distribution function that describes the distribution of the molecular weight of polymer.

According to a second aspect of the present invention, to attain the aforementioned object, there is provided a method for producing a cellulose resin film, including the steps of: discharging two cellulose resins A and B molten in the respective extruders in the form an A/B two-layer sheet from a die upon a support by co-extrusion; and cooling and solidifying the sheet-shaped molten resin into a film, wherein the resin A, which forms the outer layer of the A/B two-layer sheet not in contact with the support, has a number average molecular weight smaller than that of the resin B, which forms the inner layer of the A/B two-layer sheet in contact with the support, and the resin A has a number average molecular weight of 20,000 or more and 50,000 or less, and the resin B has a number average molecular weight of 30,000 or more and 100,000 or less.

The second aspect is the same as the first aspect; however, the first aspect employs a two-component and three-layer cellulose resin film, which is made up of three layers of two different resins, while the second aspect employs a two-component and two-layer cellulose resin film. In the two-component and two-layer cellulose resin film, the cellulose resin forming the outer layer, which is in contact with the cooling support, has a number average molecular weight smaller than that of the cellulose resin forming the inner layer. Thus the cellulose resin forming the inner layer, which is essential for the optical characteristics of the film and is in contact with the cooling support, is protected by the cellulose resin forming the outer layer, which has a number average molecular weight smaller than that of the cellulose resin forming the inner layer, whereby the deterioration of the film surface and the occurrence of die lines in the film can be prevented.

According to a third aspect of the present invention, there is provided the method for producing a cellulose resin film according to the first or second aspect, wherein the cellulose resin forming the outer layer(s) has a thickness of 20% or less of the overall thickness of the film.

According to the third aspect, the cellulose resin forming the outer layer(s) has a thickness selected so that it accounts for 20% or less of the overall thickness of the film; thus, the proportion of the outer layer thickness is small enough not to affect the optical characteristics of the film. Thus, a cellulose resin film can be provided which is less susceptible to deterioration and can be used as a highly functional film for optical applications. There is no problem of thickness of the cellulose resin forming the outer layer(s), as long as it is 20% or less of the overall thickness of the film; however, preferably it is 10% or less and more preferably 5% or less of the overall thickness of the film.

According to a fourth aspect of the present invention, there is provided the method for producing a cellulose resin film according to any one of the first to third aspects, wherein the outer layer(s) have a width of 99% or more of the overall width of the film.

According to the fourth aspect, the outer layer(s) have a width of 99% or more of the overall width of the film. This means almost overall width of the film can be used as a product, and thus, a cellulose resin film having no useless portion can be produced.

According to a fifth aspect of the present invention, there is provided the method for producing a cellulose resin film according to the fourth aspect, wherein the cellulose resin forming the outer layer(s) is expanded in the widthwise direction by adjusting the width of a manifold of the die with movable resistance elements provided on both ends of the manifold.

According to the fifth aspect, the cellulose resin forming the outer layer(s) is expanded in the widthwise direction by adjusting the width of the manifold of the die with movable resistance elements provided on both ends of the manifold. Thus, the proportion of the cellulose resin film that can be used as a product can be increased.

According to a sixth aspect of the present invention, there is provided the method for producing a cellulose resin film according to any one of the first to fifth aspects, wherein the die is a multi-manifold die.

According to the sixth aspect, the die is a multi-manifold die. Thus, the thickness of the inner layer and that of the outer layer(s) can be held uniform, and at the same time, the two cellulose resin in the molten state are inhibited from intermingling with each other.

According to a seventh aspect of the present invention, there is provided the method for producing a cellulose resin film according to any one of the first to sixth aspects, wherein the die has a lip land with a length of 5 mm or more and 150 mm or less. According to the seventh aspect, the die has a lip land with a length of 5 mm or more and 150 mm or less. This produces the smoothing effect of smoothing the surface of the sheet-shaped resin discharged from the die, thereby decreasing the surface roughness of the cellulose resin film. There is no problem of length of the lip land of the die, as long as it is 5 mm or more and 150 mm or less; however, preferably it is 10 mm or more and 120 mm or less and more preferably 30 mm or more and 100 mm or less. The term "the length of the lip land" herein used means the distance between the manifold of the die and the discharge opening.

According to an eighth aspect of the present invention, there is provided a cellulose resin film, wherein the cellulose resin film is produced by the production process according to any one of the first to seventh aspects. According to a ninth aspect of the present invention, there is provided a sheet polarizer comprising at least one stacked layer of the cellulose resin film according to the eighth aspect. According to a tenth aspect of the present invention, there is provided an optical compensation film for liquid crystal display panels, comprising, as a substrate, the cellulose resin film according to the eighth aspect. According to an eleventh aspect of the present invention, there is provided an antireflection film, comprising, as a substrate, the cellulose resin film according to the eighth aspect.

According to the present invention, the cellulose resin forming the inner layer, which is essential for the optical characteristics of the film but susceptible to deterioration, is protected by the cellulose resin forming the outer layer(s), which has a number average molecular weight smaller than that of the cellulose resin forming the inner layer, and therefore less susceptible to deterioration, whereby the deterioration of the entire film and the occurrence of die lines in the film can be prevented. Thus, a high-quality and high-function film, as an excellent film for optical applications, can be provided.

BRIEF DESCRIPTION OF THE DRAWINGS

FIG. 6 is an illustration of examples of the present invention.

DESCRIPTION OF REFERENCE NUMERALS

10 . . . Film production apparatus, 12 . . . Cellulose acylate film, 14 . . . Film forming section, 16 . . . Longitudinal stretching section, 18 . . . Transverse stretching section, 20 . . . Winding-up section, 22 . . . Extruder, 24 . . . Extruder, 25 . . . Feed block, 26 . . . Die, 26a . . . Single-layer die, 28 . . . Cooling drums, 30, 32 . . . Nip rollers, 52 . . . Cylinder, 58 . . . Single-shaft screw, 60 . . . Feed opening, 62 . . . Discharge opening, 70, 72, 74 . . . Flow path, 76 . . . Joining portion, 78 . . . Flow path, 80 . . . Manifold, 82 . . . Slit, 84 . . . Discharge opening, 85 . . . Resistance element, 86, 88, 90 . . . Manifold, 92 . . . Joining portion, 94 . . . Slit, 96 . . . Discharge opening, A, B . . . Cellulose acylate resin, M . . . Length of lip land, X . . . Overall width of film (width of inner layer), Y . . . Width of outer layer

BEST MODE FOR CARRYING OUT THE INVENTION

In the following preferred embodiments of the method for producing a cellulose resin film of the present invention will be described with reference to the accompanying drawings. While these embodiments will be described in terms of production of a cellulose acylate resin film, the present invention is not limited to the embodiments, but is applicable to production of various cellulose resin films.

Figure 1:
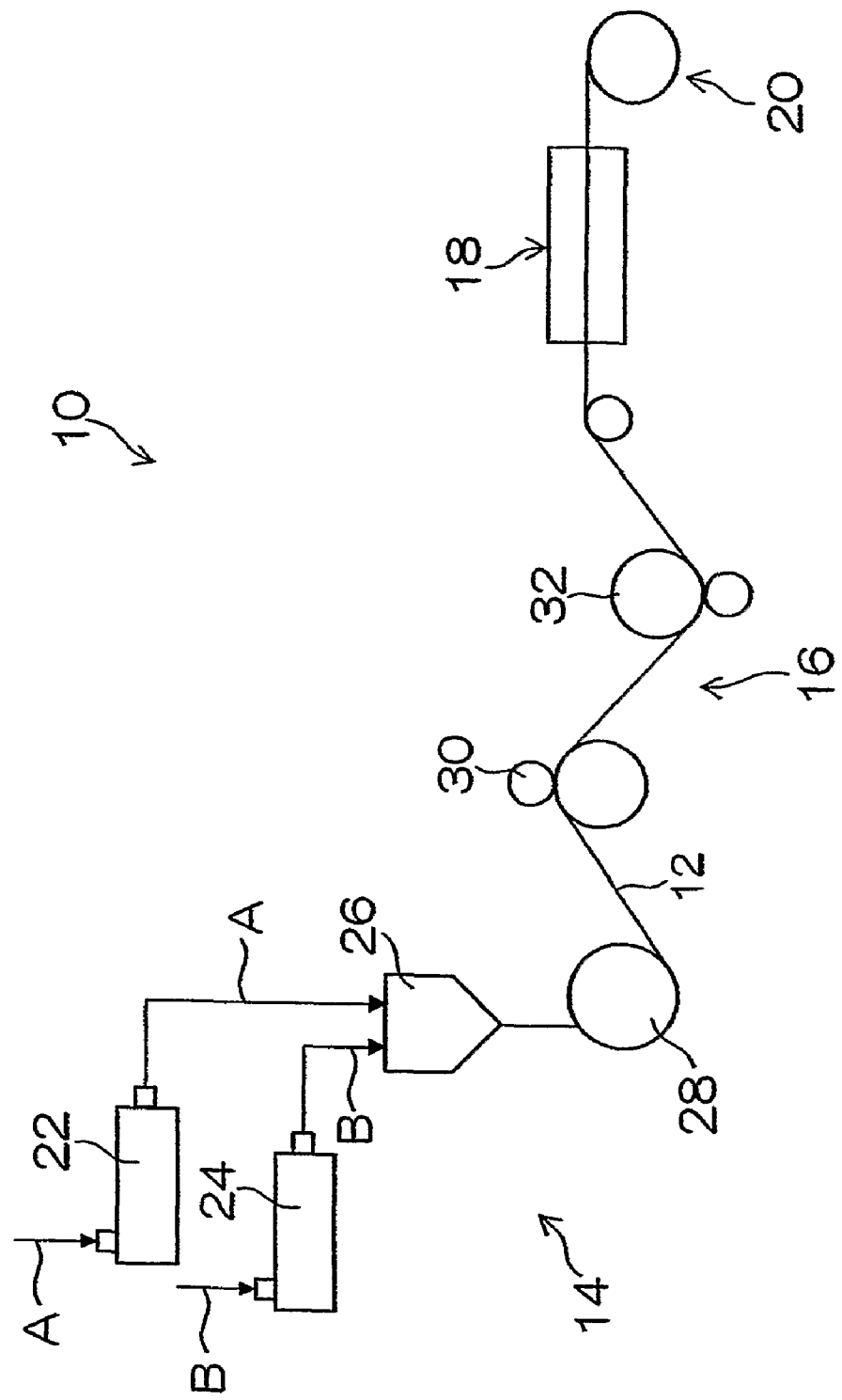
FIG. 1 is a block diagram showing the film production apparatus to which the present invention is applied.

FIG. 1 is a schematic diagram showing one example of apparatus for production of a cellulose acylate resin film of the present invention, with which a stretched cellulose acylate resin film is produced by melt film forming process.

As shown in FIG. 1, the apparatus 10 consists mainly of: a film forming section 14 where an unstretched cellulose acylate film 12 is formed; a longitudinal stretching section 16 where the cellulose acylate film 12 having been formed in the film forming section 14 is stretched longitudinally; a transverse stretching section 18 where the cellulose acylate film 12 having been formed in the forming section is stretched transversely; and a winding-up section 20 where the stretched cellulose acylate film 12 is wound up.

In the film forming section 14, two different cellulose acylate resin A and B having been molten in an extruder 22 and an extruder 24, respectively, are extruded from a die 26 into a sheet and cast upon a rotating cooling drum 28. The sheet of the molten resin is cooled and solidified on the surface of the drum 28 to be a cellulose acylate film 12. The cellulose acylate film 12 is stripped from the cooling drum 28, fed to the longitudinal stretching section 16 and the transverse stretching section 18 in this order where it is stretched longitudinally and transversely, and wound up into a roll in the winding-up section 20. Thus, a stretched cellulose acylate film 12 is produced.

The cellulose acylate resin A has a number average molecular weight smaller than that of the cellulose acylate resin B. And the number average molecular weight of the cellulose acylate resin A is in the range of 20,000 to 50,000, while that of the cellulose acylate resin B is in the range of 30,000 to 100,000.

Each of the above sections will be described in detail below.

Figure 2:
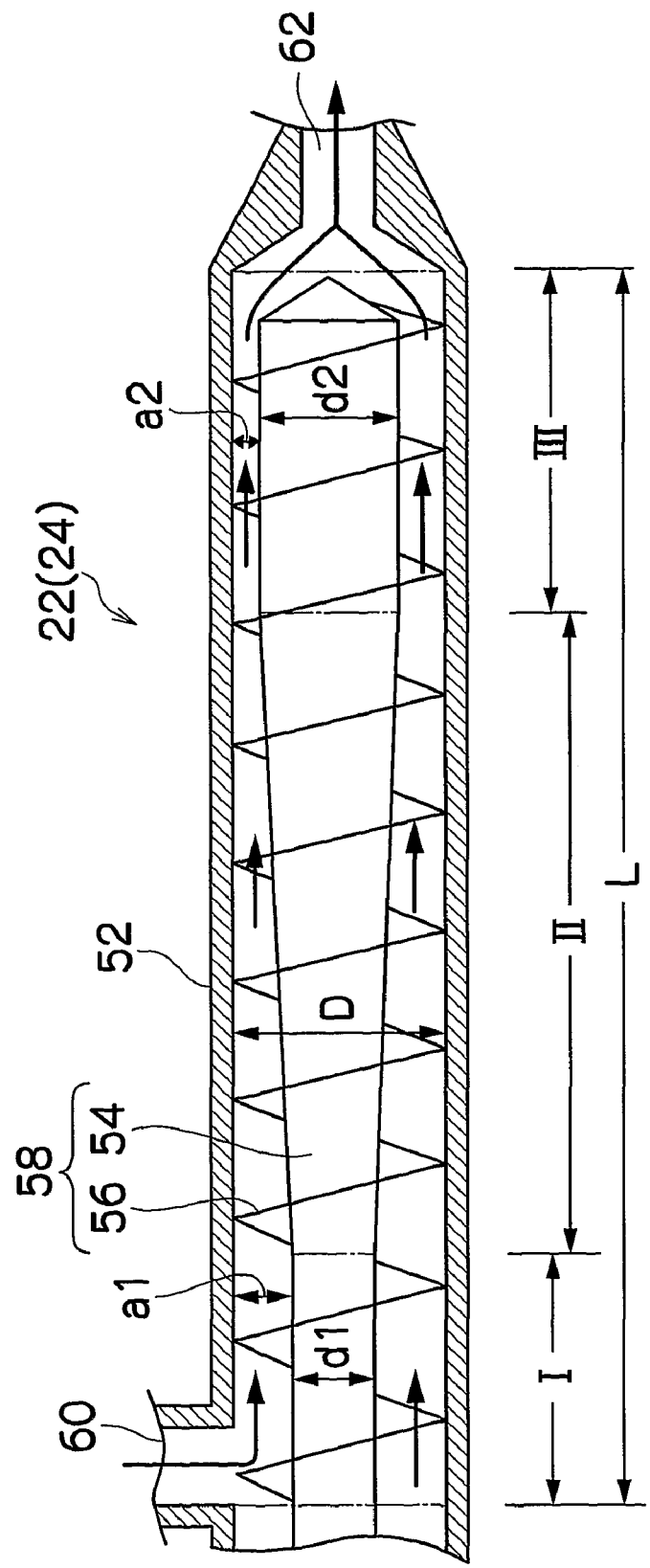
FIG. 2 is a schematic view showing the construction of an extruder.

FIG. 2 shows the construction of the extruder 22 (24) in the film forming section 14. As shown in FIG. 2, in the cylinder 52 of the extruder 22 (24), a single-shaft screw 58 consisting of a screw shaft 54 and a flight 56 is provided, and the single-shaft screw 58 is so designed that it is rotated by a motor not shown in the figure.

At the feed opening 60 of the cylinder 52, is provided a hopper, from which the cellulose acylate resin A (B) is fed into the cylinder 52 through the feed opening 60.

The inside of the cylinder 52 consists of: a feeding section where the cellulose acylate resin fed through the feed opening 60 is transported in a fixed amount (the area shown by character I); a compressing section where the cellulose acylate resin is kneaded and compressed (the area shown by character II); and a measuring section where the kneaded and compressed cellulose acylate resin is measured (the area shown by character III). The cellulose acylate resin having been molten in the extruder 22 (24) is continuously fed into the die 26 through a discharge opening 62.

The screw compression ratio of the extruder 22 (24) is set to 2.5 to 4.5 and L/D to 20 to 70. The term "screw compression ratio" herein used means the volume ratio of the feeding section A to the measuring section C, in other words, the volume per unit length of the feeding section A÷the volume per unit length of the measuring section C, and it is calculated using the outside diameter d1 of the screw shaft 34 of the feeding section A, the outside diameter d2 of the screw shaft 34 of the measuring section C, the diameter a1 of the flight channel of the feeding section A and the diameter a2 of the flight channel of the measuring section C. The term "L/D" herein used means the ratio of the length (L) to the inside diameter (D) of the cylinder shown in FIG. 2. The extrusion temperature (the outlet temperature of the extruder) is set to 190 to 240° C. When the temperature inside the extruder 22 (24) is higher than 240° C., a refrigerator (not shown in the figure) should be provided between the extruder 22 (24) and the die 26.

The extruder 22 (24) may be either a single-screw extruder or a twin-screw extruder. However, if the screw compression ratio is as low as less than 2.5, the thermoplastic resin is not fully kneaded, thereby causing an unmolten part, or the magnitude of heat evolution by shear stress is too small to sufficiently fuse crystals, thereby making fine crystals more likely to remain in the formed cellulose acylate film. Furthermore, the cellulose acylate film is made more likely to include air bubbles. Thus, in stretching of the cellulose acylate film 12, the remaining crystals inhibit the stretchability of the film, whereby the degree of film orientation cannot be sufficiently increased. Conversely, if the screw compression ratio is as high as more than 4.5, the magnitude of heat evolution by shear stress is so large that the resin becomes more likely to deteriorate by heat, which makes the formed cellulose acylate film more likely to yellow. Further, too large shear stress causes molecule breakage, which results in decrease in molecular weight, and hence in mechanical strength of the film. Accordingly, to make the formed cellulose acylate film less likely to yellow and less likely to break in stretching, the screw compression ratio is preferably in the range of 2.5 to 4.5, more preferably in the range of 2.8 to 4.2, and particularly preferably in the range of 3.0 to 4.0.

The L/D as low as less than 20 causes insufficient melting or insufficient kneading, which makes fine crystals more likely to remain in the formed cellulose acylate film, like the case where the compression ratio is too low. Conversely, the L/D as high as more than 70 makes too long the residence time of the cellulose acylate resin in the extruder 22 (24), which makes the resin more likely to deteriorate. Too long a residence time may cause molecule breakage, which results in decrease in molecular weight, and hence in mechanical strength of the film. Accordingly, to make the formed cellulose acylate film less likely to yellow and less likely to break in stretching, the L/D is preferably in the range of 20 to 70, more preferably in the range of 22 to 45, and particularly preferably in the range of 24 to 40.

If the extrusion temperature is as low as lower than 190° C., crystals are not sufficiently melted, which makes fine crystals more likely to remain in the formed cellulose acylate film. As a result, when stretching the cellulose acylate film, the remaining crystals inhibit the stretchability of the film, whereby the degree of film orientation cannot be sufficiently increased. Conversely, if the extrusion temperature is as high as higher than 240° C., the cellulose acylate resin deteriorates, which causes the degree of yellow (YI value) to increase. Accordingly, to make the formed cellulose acylate film less likely to yellow and less likely to break in stretching, the extrusion temperature is preferably in the range of 190° C. to 240° C., more preferably in the range of 195° C. to 235° C., and particularly preferably in the range of 200° C. to 230° C.

The molten resin is continuously fed to the die 26 of FIG. 1. The die 26 of FIG. 3 consists of: a feed block 25 for allowing the two molten cellulose acylate resin A and B to join each other in the form of a three-layer sheet; and a single-layer die 26a for expanding the sheet of joined resin A and B in the widthwise direction.

Figure 4:
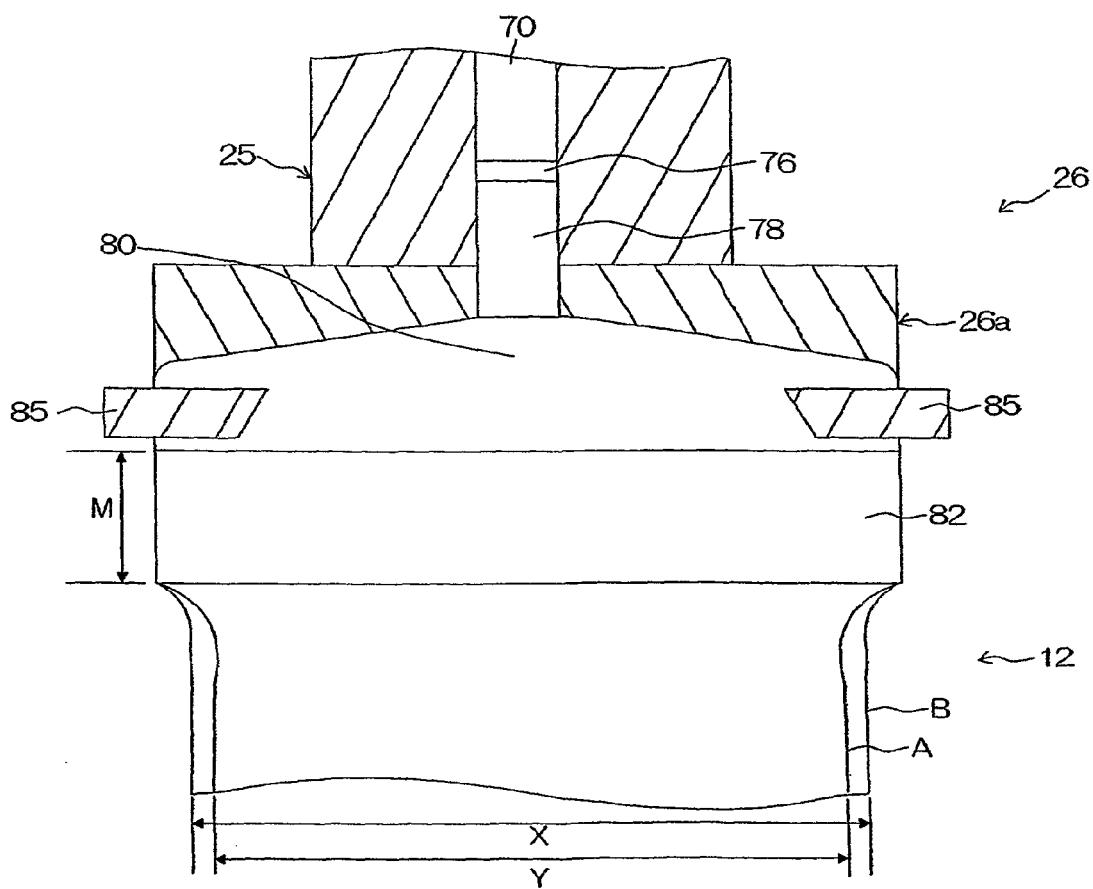
FIG. 4 is a schematic view of the die to which the present invention is applied.

Into the flow path 70 of the feed block 25 and the flow paths 72 and 74 of the same, the molten cellulose acylate resin B and the molten cellulose acylate resin A are fed from the extruder 22 and the extruder 24, respectively. The flow paths 70, 72 and 74 join each other at the joining portion 76, and the two molten cellulose acylate resin A and B join each other at the joining portion 76 and are fed to the single-layer die 26a through the flow path 78. The joined molten cellulose acylate resin A and B are expanded in the widthwise direction in the manifold 80 of the single-layer die 26a and discharged from the discharge opening 84 upon the drum 28 through the slit 82. If the distance between the manifold 80 of the die 26 and the discharge opening 84 of the same (length of lip land) M, as shown in FIG. 4, is in the range of 5 mm or more and 150 mm or less, the smoothing effect is produced, whereby the surface roughness of the cellulose acylate film 12 can be decreased. There is no problem of length of the lip land M, as long as it is 5 mm or more and 150 mm or less; however, preferably it is 10 mm or more and 120 mm or less and more preferably 30 mm or more and 100 mm or less.

Figure 3:
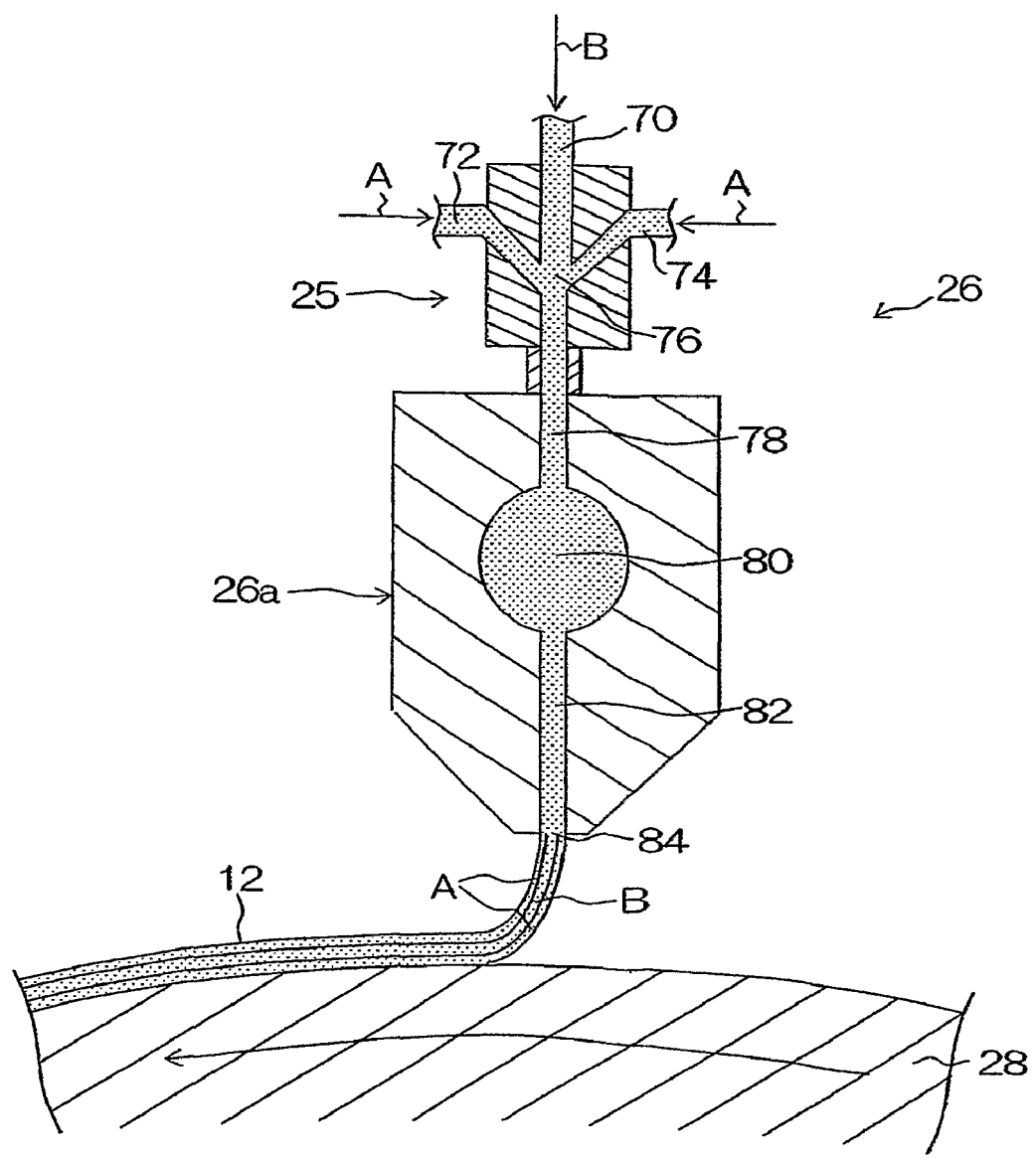
FIG. 3 is a schematic view of the die to which the present invention is applied.

FIG. 4 is a cross-sectional view of the die 26 of FIG. 3, taken in the widthwise direction of the molten resin which is discharged in the form of a sheet after passing through the flow paths 70, 78 and the slit 82.

From the leading edge (bottom end) of the die 26, the molten resin is discharged in the form of a sheet, and the molten resin in the form of a sheet is cast upon the drum 28, cooled and solidified on the surface of the drum 28, and stripped from the surface of the drum 28 to give a cellulose acylate film 12. Preferably the molten cellulose acylate resin A is expanded in the widthwise direction by adjusting the width of the manifold 80 of the single-layer die 26a with movable resistance elements 85, 85 provided on both ends of the manifold 80, as shown in FIG. 4. Generally retention of the molten resin occurs on both ends of the manifold 80, and in co-extrusion, the resin forming the outer layer(s) receives flow resistance, whereby the width Y of the outer layer becomes smaller than the width X of the inner layer. However, placing the movable resistance elements 85, 85, provided on both ends of the manifold 80, in the right place makes it possible to change the flow of the resin, whereby the cellulose acylate resin forming the outer layer can be expanded in the widthwise direction and the proportion of the cellulose acylate resin film usable can be increased. Preferably the width Y of the outer layer accounts for 99% or more of the overall width of the film (or the width of the inner layer), because this means that almost overall width of the film can be used as a product, and thus, a cellulose resin film having no useless portion can be produced.

The thickness of the cellulose acylate resin forming the outer layer is selected so that it accounts for 20% or less of the overall thickness of the film. This can be realized by narrowing the flow paths 72 and 74. If the thickness of the cellulose acylate resin forming the outer layer is kept 20% or less of the overall thickness of the film, the proportion of the thickness of the outer layer is decreased, and as a result, superior optical characteristics of the inner layer having a high number average molecular weight, make a major contribution to high function of the film. Thus, a cellulose acylate film 12 suitably used as a highly functional film for optical applications can be provided. There is no problem of thickness of the cellulose resin forming the outer layer(s), as long as it is 20% or less of the overall thickness of the film; however, preferably it is 10% or less and more preferably 5% or less of the overall thickness of the film.

Figure 5:
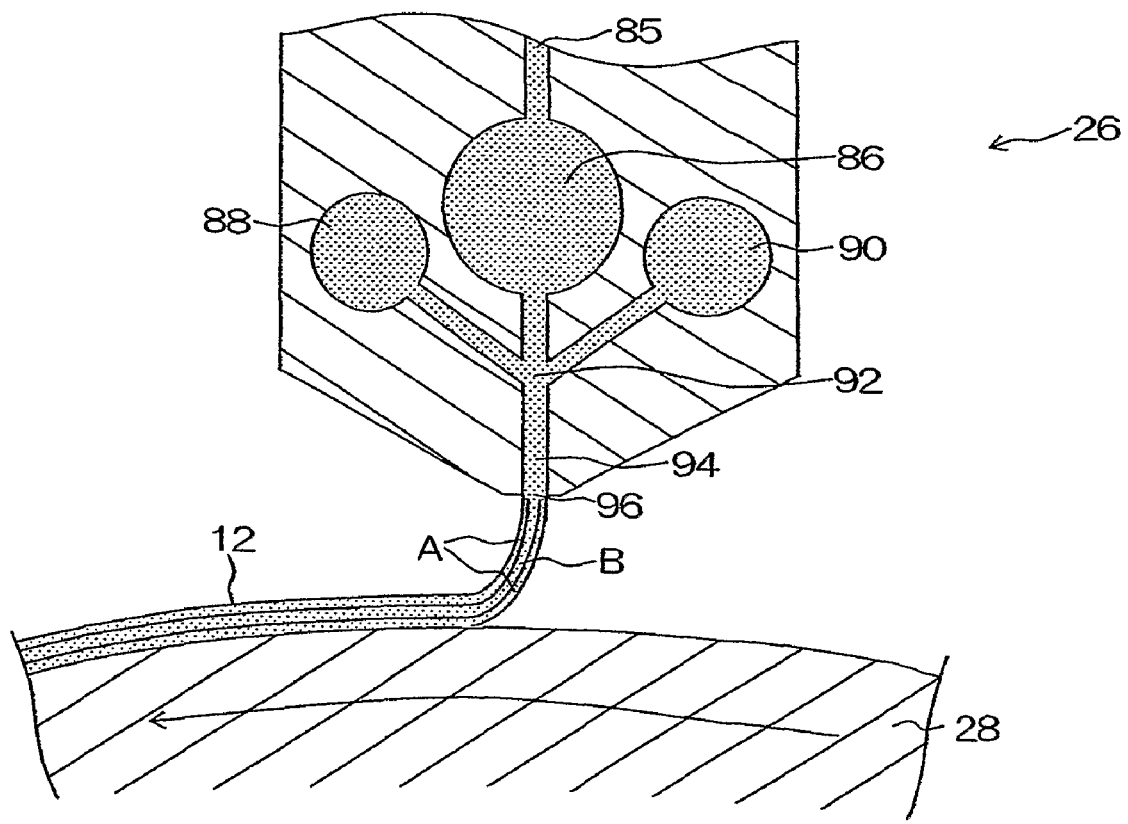
FIG. 5 is a cross-sectional view of the die to which the present invention is applied.

FIG. 5 is a schematic view of a multi-manifold die 26 having a plurality of manifolds 86, 88, 90 (3 in FIG. 5) in accordance with another embodiment of the present invention. To the manifold 86, the cellulose acylate resin B is fed from the extruder 22 via the flow path 85, while to the manifolds 88 and 90, the cellulose acylate resin A is fed from the extruder 24 via flow paths not shown in the figure. The cellulose acylate resin A and the cellulose acylate resin B join each other at the joining portion 92 and the joined cellulose acylate resin A and B are discharged from the discharge opening 96 upon the drum 28 through the slit 94. Employing a multi-manifold die as the die 26 makes it possible to keep both the thicknesses of the inner layer and the outer layer uniform, and besides, to control the intermingling of the two the cellulose acylate resin. Further, if movable resistance elements, not shown in the figure, are placed in an appropriate position, like in the case of the feed-block die of FIG. 3, the cellulose acylate resin forming the outer layer can be expanded in the widthwise direction.

As described so far, in the method for producing a three-layer cellulose acylate resin film that comprises the steps of: discharging two cellulose acylate resins molten in respective extruders in the form of a sheet from a die upon a cooling support by co-extrusion; and cooling and solidifying the sheet-shaped molten resin on the surface of the cooling support, in particular, in the method for producing a three-layer cellulose acylate resin film that comprises the steps of: discharging two cellulose acylate resins A and B molten in the respective extruders in the form of an A/B/A three-layer sheet from a die upon a cooling support by co-extrusion; and cooling and solidifying the sheet-shaped molten resin on the surface of the cooling support, if the resin A forming a pair of the outer layers of the A/B/A three-layer sheet has a number average molecular weight smaller than that of the resin B forming the inner layer of the A/B/A three-layer sheet, and if the number average molecular weight of the resin A is 20,000 or more and 50,000 or less while the number average molecular weight of the resin B is 30,000 or more and 100,000 or less, the cellulose acylate resin forming the inner layer, which is essential for the optical characteristics of the film but susceptible to deterioration, can be protected by the cellulose resin forming the outer layer, which has a number average molecular weight smaller than that of the cellulose resin forming the inner layer. Thus, the deterioration of the entire film and the occurrence of die lines in the film can be prevented.

Although the present invention has been described in terms of production of a three-layer cellulose acylate resin film, in which two cellulose acylate resins is discharged in the form of a sheet from a die upon a cooling support by co-extrusion and the sheet-shaped joined molten resin is cooled and solidified on the surface of the cooling support, it is also applicable to production of a two-layer cellulose acylate film, in which two cellulose acylate resin is discharged in the form of a sheet from a die upon a cooling support by co-extrusion and the sheet-shaped joined molten resin is cooled and solidified on the surface of the cooling support.

In the latter case, if the cellulose acylate resin in contact with the support is defined as an inner layer, and if the resin A forming the outer layer of the A/B two-layer sheet, which is not in contact with the support, has a number average molecular weight smaller than that of the resin B forming the inner layer, and the number average molecular weight of the resin A is 20,000 or more and 50,000 or less while the number average molecular weight of the resin B is 30,000 or more and 100,000 or less, the cellulose acylate resin forming the inner layer, which is essential for the optical characteristics of the film but susceptible to deterioration, is protected by the cellulose resin forming the outer layer, which has a number average molecular weight smaller than that of the cellulose resin forming the inner layer and is not susceptible to deterioration. In other words, the deterioration of the film surface and the occurrence of die lines in the film can be prevented.

The molten resin is discharged in the form of a sheet from the leading edge of the die 26 formed as above, cooled and solidified on the surface of the drum 28, and stripped from the surface of the drum 28 to give a cellulose acylate film 12.

The cellulose acylate film 12 formed in the film forming section 14 is then fed to the longitudinal stretching section 16 and the transverse stretching section 18 in this order. In the following the stretching process, where the cellulose acylate film 12 formed in the film forming section 14 is stretched into a stretched cellulose acylate film 12, will be described.

Stretching of the cellulose acylate film 12 is performed so as to orient the molecules in the cellulose acylate film 12 and develop the in-plane retardation (Re) and the retardation across the thickness (Rth) in the film. The retardations Re and Rth are obtained from the following equations.

$$Re\ (nm) = |n(MD) - n(TD)| \times T\ (nm)$$

$$Rth\ (nm) = |\{(n(MD) + n(TD))/2\} n(TH)| \times T\ (nm)$$

The characters, n(MD), n(TD) and n(TH), in the above equations indicate the refractive indexes across the length, across the width and across the thickness, respectively, and the character T the thickness in nm.

As shown in FIG. 1, the cellulose acylate film 12 is first stretched in the longitudinal direction in the longitudinal stretching section 16. In the longitudinal stretching section 16, the cellulose acylate film 12 is preheated and the cellulose acylate film 12 in the heated state wound around the two nip rolls 30, 32. The nip roll 32 on the outlet side conveys the cellulose acylate film 12 at higher conveying speeds than the nip roll 30 on the inlet side, whereby the cellulose acylate film 12 is stretched in the longitudinal direction.

The cellulose acylate film 12 having been stretched longitudinally is fed to the transverse stretching section 18 where it is stretched across the width. In the transverse stretching section 18, a tenter is suitably used. The tenter stretches the cellulose acylate film 12 in the transverse direction while fastening both side ends of the film 12 with clips. This transverse stretching can further increase the retardation Rth.

Applying the above described longitudinal and transverse stretching treatment to the cellulose acylate film 12 provides a stretched cellulose acylate film 12 where retardations Re, Rth have been developed. In the stretched cellulose acylate film 12, Re is 0 nm or more and 500 nm or less, preferably 10 nm or more and 400 nm or less and more preferably 15 nm or more and 300 nm or less, and Rh is 0 nm or more and 500 nm or less, preferably 50 nm or more and 400 nm or less and more preferably 70 nm or more and 350 nm or less. Of the Re and Rth in the above described range, those satisfy the expression Re≦Rth are preferable, and those satisfy the expression Re×2≦Rth are more preferable. To realize such high Re and low Rth, preferably the cellulose acylate film having undergone longitudinal stretching further undergoes transverse (across-the width) stretching. Specifically, in-plane retardation (Re) represents the difference between the orientation in the longitudinal direction and the orientation in the transverse direction, and if the stretching is performed not only in the longitudinal direction, but in the transverse direction—the direction perpendicular to the longitudinal direction, the difference between the orientation in the longitudinal direction and the orientation in the transverse direction can be decreased, and hence the in-plane retardation (Re). And at the same time, stretching in both the longitudinal and transverse directions increases the square of magnification, and therefore, the orientation across the thickness increases with decrease in the thickness, which in turn increases Rth.

Variations in Re and Rth with location in the widthwise direction and across the length are kept preferably 5% or less, more preferably 4% or less and much more preferably 3% or less. Further, preferably the orientation angle is kept 90°±5° or less, or 0°±5° or less, more preferably 90°±3° or less, or 0°±3° or less and much more preferably 90°±10 or less, or 0°±1° or less. Doing stretching treatment just like the stretching treatment of the present invention enables the occurrence of bowing phenomenon to be reduced. Preferably stretching treatment is done so that the bowing distortion is kept 10% or less, more preferably 5% or less, and much more preferably 3%. The bowing distortion herein used means the value obtained by dividing, by the width, the deviation, which occurs at the center portion of the cellulose acylate film deformed into a concave shape after stretching, from the straight line drawn in the widthwise direction on the face of the cellulose acylate film 12 before tentering.

While the present invention has been described in terms of an embodiment where a cellulose acylate film is produced through a stretching step, it is also applicable to the case where a cellulose acylate film is produced without a stretching step.

In the following cellulose acylate resins, methods for processing a cellulose acylate film, etc. suitably used for the present invention will be described in detail following the procedures.

(1) Plasticizer

To a resin for use in producing a cellulose acylate film according to the present invention, preferably a polyol plasticizer is added. Such a plasticizer has effects of not only lowering the modulus of elasticity of the resin, but also decreasing the difference in crystal amount between both sides of the film.

The content of a polyol plasticizer in the cellulose acylate resin is preferably 2 to 20% by weight. The polyol plasticizer content is preferably 2 to 20% by weight, more preferably 3 to 18% by weight, and much more preferably 4 to 15% by weight.

If the polyol plasticizer content is less than 2% by weight, the above described effects cannot be fully attained, while if the polyol plasticizer content is more than 20% by weight, bleeding (migration of the plasticizer to the film surface) occurs.

Polyol plasticizers practically used in the present invention include: for example, glycerin-based ester compounds such as glycerin ester and diglycerin ester; polyalkylene glycols such as polyethylene glycol and polypropylene glycol; and compounds in which an acyl group is bound to the hydroxyl group of polyalkylene glycol, all of which are highly compatible with cellulose fatty acid ester and produce remarkable thermoplasticization effect.

Specific examples of glycerin esters include: not limited to, glycerin diacetate stearate, glycerin diacetate palmitate, glycerin diacetate mystirate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate mystirate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, and glycerin oleate propionate. Either any one of these glycerin esters alone or two or more of them in combination may be used.

Of these examples, preferable are glycerin diacetate caprylate, glycerin diacetate pelargonate, glycerin diacetate caprate, glycerin diacetate laurate, glycerin diacetate myristate, glycerin diacetate palmitate, glycerin diacetate stearate, and glycerin diacetate oleate.

Specific examples of diglycerin esters include: not limited to, mixed acid esters of diglycerin, such as diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramystyrate, diglycerin tetramyristylate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate mystyrate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimystyrate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimystyrate, diglycerin acetate trimyristylate, diglycerin acetate tripalmitate, diglycerin acetate tristearate, diglycerin acetate trioleate, diglycerin laurate, diglycerin stearate, diglycerin caprylate, diglycerin myristate, and diglycerin oleate. Either any one of these diglycerin esters alone or two or more of them in combination may be used.

Of these examples, diglycerin tetraacetate, diglycerin tetrapropionate, diglycerin tetrabutyrate, diglycerin tetracaprylate and diglycerin tetralaurate are preferably used.

Specific examples of polyalkylene glycols include: not limited to, polyethylene glycols and polypropylene glycols having an average molecular weight of 200 to 1000. Either any one of these examples or two of more of them in combination may be used.

Specific examples of compounds in which an acyl group is bound to the hydroxyl group of polyalkylene glycol include: not limited to, polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristylate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristylate, polyoxypropylene palmitate, polyoxypropylene stearate, polyoxypropylene oleate, and polyoxypropylene linoleate. Either any one of these examples or two or more of them in combination may be used.

To allow these polyols to fully exert the above described effects, it is preferable to perform the melt film forming of cellulose acylate under the following conditions. Specifically, in the film formation process where pellets of the mixture of cellulose acylate and polyol are melt in an extruder and extruded through a T-die, it is preferable to set the temperature of the extruder outlet (T2) higher than that of the extruder inlet (T1), and it is more preferable to set the temperature of the die (T3) higher than T2. In other words, it is preferable to increase the temperature with the progress of melting. The reason for this is that if the temperature of the above mixture is rapidly increased at the inlet, polyol is first melt and liquefied, and cellulose acylate is brought to such a state that it floats on the liquefied polyol and cannot receive sufficient shear force from the screw, which results in occurrence of un-molten cellulose acylate. In such an insufficiently mixed mixture of polyol and cellulose acylate, polyol, as a plasticizer, cannot exert the above described effects; as a result, the occurrence of the difference between both sides of the melt film after melt extrusion cannot be effectively suppressed. Furthermore, such inadequately molten matter results in a fish-eye-like contaminant after the film formation. Such a contaminant is not observed as a brilliant point even through a polarizer, but it is visible on a screen when light is projected into the film from its back side. Fish eyes may cause tailing at the outlet of the die, which results in increased number of die lines.

T1 is preferably in the range of 150 to 200° C., more preferably in the range of 160 to 195° C., and more preferably in the range of 165 to 190° C. T2 is preferably in the range of 190 to 240° C., more preferably in the range of 200 to 230° C., and more preferably in the range of 200 to 225° C. It is most important that such melt temperatures T1, T2 are 240° C. or lower. If the temperatures are higher than 240° C., the modulus of elasticity of the formed film tends to be high. The reason is probably that cellulose acylate undergoes decomposition because it is melted at high temperatures, which causes crosslinking in it, and hence increase in modulus of elasticity of the formed film. The die temperature T3 is preferably 200 to less than 235° C., more preferably in the range of 205 to 230° C., and much more preferably in the range of 205 to 225° C.

(2) Stabilizer

In the present invention, it is preferable to use, as a stabilizer, either phosphite compound or phosphite ester compound, or both phosphite compound and phosphite ester compound. This enables not only the suppression of film deterioration with time, but the improvement of die lines. These compounds function as a leveling agent and get rid of the die lines formed due to the irregularities of the die.

The amount of these stabilizers mixed is preferably 0.005 to 0.5% by weight, more preferably 0.01 to 0.4% by weight, and much more preferably 0.02 to 0.3% by weight of the resin mixture.

(i) Phosphite Stabilizer

Specific examples of preferred phosphite color protective agents include: not limited to, phosphite color protective agents expressed by the following chemical formulas (general formulas) (1) to (3).

Chemical Formula (1)

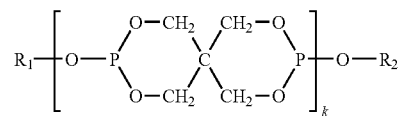

-continued

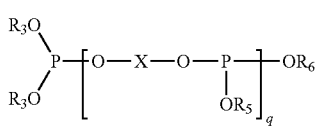
Chemical Formula (2)

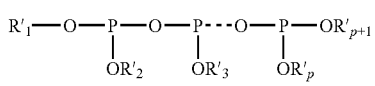
Chemical Formula (3)

(In the above chemical formulas, R1, R2, R3, R4, R5, R6, R'1, R'2, R'3 . . . R'n, R'n+1 each represent hydrogen or a group selected from the group consisting of alkyl, aryl, alkoxyalkyl, aryloxyalkyl, alkoxyaryl, arylalkyl, alkylaryl, polyaryloxyalkyl, polyalkoxyalkyl and polyalkoxyaryl which have 4 or more and 23 or less carbon atoms. However, in the chemical formulas (1), (2) and (3), at least one substituent is not hydrogen. X in the phosphite color protective agents expressed by the chemical formula (2) represents a group selected from the group consisting of aliphatic chain, aliphatic chain with an aromatic nucleus on its side chain, aliphatic chain including an aromatic nucleus in it, and the above described chains including two or more oxygen atoms not adjacent to each other. k and q independently represents an integer of 1 or larger, and p an integer of 3 or larger.)

The k, q in the phosphite color protective agents are preferably 1 to 10. If the k, q are 1 or larger, the agents are less likely to volatilize when heating. If they are 10 or smaller, the agents have an improved compatibility with cellulose acetate propionate. Thus the k, q in the above range are preferable. p is preferably 3 to 10. If the p is 3 or more, the agents are less likely to volatilize when heating. If the p is 10 or less, the agents have improved compatibility with cellulose acetate propionate.

Specific examples of preferred phosphite color protective agents expressed by the chemical formula (general formula) (1) below include phosphite color protective agents expressed by the chemical formulas (4) to (7) below.

Chemical Formula (1)

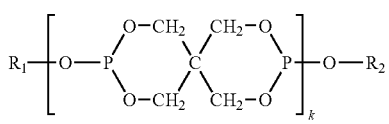

Chemical Formula (4)

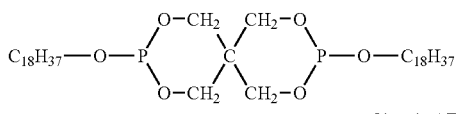

Chemical Formula (5)

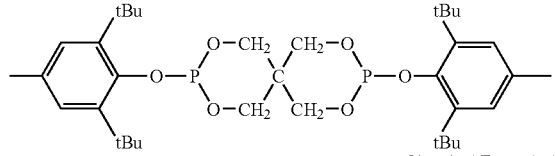

Chemical Formula (6)

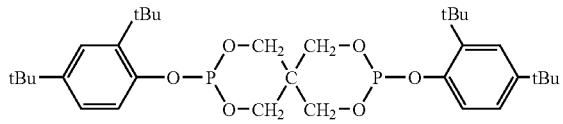

Chemical Formula (7)

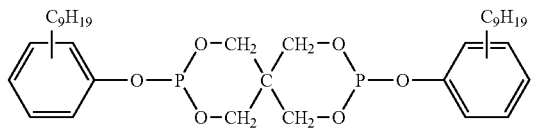

Specific examples of preferred phosphite color protective agents expressed by the chemical formula (general formula) (2) below include phosphite color protective agents expressed by the chemical formulas (8), (9) and (10) below.

Chemical Formula (2)

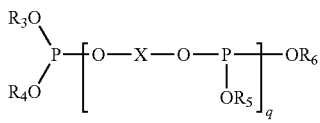

Chemical Formula (8)

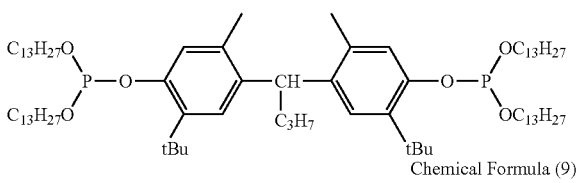

Chemical Formula (9)

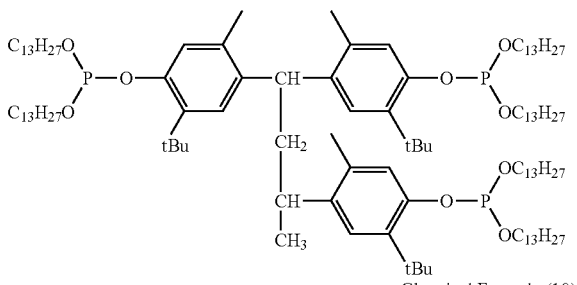

Chemical Formula (10)

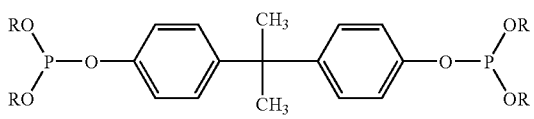

R=alkyl group with 12 to 15 carbon atoms (ii) Phosphite Ester Stabilizer

Examples of phosphite ester stabilizers include: cyclic neopentane tetraylbis(octadecyl)phosohite, cyclic neopentane tetraylbis(2,4-di-t-butylphenyl)phosohite, cyclic neopentane tetraylbis(2,6-di-t-butyl-4-methylphenyl)phosohite, 2,2-methylene-bis(4,6-di-t-butylphenyl)octylphosphite, and tris(2,4-di-t-butylphenyl)phosphite.

(iii) Other Stabilizers

A weak organic acid, thioether compound, or epoxy compound, as a stabilizer, may be mixed with the resin mixture.

Any weak organic acids can be used as a stabilizer in the present invention, as long as they have a pKa of 1 or more, do not interfere with the action of the present invention, and have color preventive and deterioration preventive properties. Examples of such weak organic acids include: tartaric acid, citric acid, malic acid, fumaric acid, oxalic acid, succinic acid and maleic acid. Either any one of these acids alone or two or more of them in combination may be used.

Examples of thioether compounds include: dilauryl thiodipropionate, ditridecyl thiodipropionate, dimyristyl thiodipropionate, distearyl thiodipropionate, and palmityl stearyl thiodipropionate. Either any one of these compounds alone or two or more of them in combination may be used.

Examples of epoxy compounds include: compounds derived from epichlorohydrin and bisphenol A. Derivatives from epichlorohydrin and glycerin or cyclic compounds such as vinyl cyclohexene dioxide or 3,4-epoxy-6-methylcyclo-hexylmethyl-3,4-epoxy-6-methylcyclohexane carboxylate can also be used. Epoxydized soybean oil, epoxydized castor oil or long-chain α-olefin oxides can also be used. Either any one of these compounds alone or two or more of them in combination may be used.

(3) Cellulose Acylate

<<Cellulose Acylate Resin>>

(Composition, Degree of Substitution)

A cellulose acylate that satisfies all of the requirements expressed by the following formulas (1) to (3) is preferably used in the present invention.

$$2.0 \leq X+Y \leq 3.0 \quad \text{formula (1)}$$

$$0 \leq X \leq 2.0 \quad \text{formula (2)}$$

$$1.2 \leq Y \leq 2.9 \quad \text{formula (3)}$$

(In the above formulas (1) to (3), X represents the substitution degree of acetate group and Y represents the sum of the substitution degrees of propionate group, butyrate group, pentanoyl group and hexanoyl group.)

A cellulose acylate that satisfies all of the requirements expressed by the following formulas (4) to (6) is more preferably used in the present invention.

$$2.4 \leq X+Y \leq 3.0 \quad \text{formula (4)}$$

$$0.05 \leq X \leq 1.8 \quad \text{formula (5)}$$

$$1.3 \leq Y \leq 2.9 \quad \text{formula (6)}$$

A cellulose acylate that satisfies all of the requirements expressed by the following formulas (7) to (9) is still more preferably used in the present invention.

$$2.5 \leq X+Y \leq 2.95 \quad \text{formula (7)}$$

$$0.1 \leq X \leq 1.6 \quad \text{formula (8)}$$

$$1.4 \leq Y \leq 2.9 \quad \text{formula (9)}$$

Thus, the cellulose acylate resin used in the present invention is characterized in that it has propionate, butyrate, pentanoyl and hexanoyl groups introduced into it. Setting the substitution degrees in the above described range is preferable because it enables the melt temperature to be decreased and the pyrolysis caused by melt film formation to be suppressed. Conversely, setting the substitution degrees outside the above described range is not preferable, because it allows the modulus of elasticity of the film to be outside the range of the present invention.

Either any one of the above cellulose acylates alone or two or more of them in combination may be used. A cellulose acylate into which a polymeric ingredient other than cellulose acylate has been properly mixed may also be used.

In the following a method for producing the cellulose acylate according to the present invention will be described in detail. The raw material cotton for the cellulose acylate according to the present invention or process for synthesizing the same are described in detail in Journal of Technical Disclosure (Laid-Open No. 2001-1745, issued on Mar. 15, 2001, Japan Institute of Invention and Innovation), pp. 7-12.

(Raw Materials and Pretreatment)

As a raw material for cellulose, one from broadleaf pulp, conifer pulp or cotton linter is preferably used. As a raw material for cellulose, a material of high purity whose α-cellulose content is 92% by mass or higher and 99.9% by mass or lower is preferably used.

When the raw material for cellulose is a film-like or bulk material, it is preferable to crush it in advance, and it is preferable to crush the material to such a degree that the cellulose is in the form of fluff.

(Activation)

Preferably, the cellulose material undergoes treatment, prior to acylation, where it is brought into contact with an activator (activation). As an activator, a carboxylic acid or water can be used. When water is used, it is preferable to carry out, after the activation, the steps of: adding excess acid anhydride to the material to dehydrate it; washing the material with carboxylic acid to replace water; and control the acylation conditions. The activator can be controlled to any temperature before it is added to the material, and a method for its addition can be selected from the group consisting of spraying, dropping and dipping.

Carboxylic acids preferably used as an activator are those having 2 or more and 7 or less carbon atoms (e.g. acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid), more preferably acetic acid, propionic acid and butyric acid, and particularly preferably acetic acid.

When carrying out the activation, catalyst for acylation such as sulfuric acid can also be added according to the situation. However, addition of a strong acid such as sulfuric acid can sometimes promote depolymerization; thus, preferably the amount of the catalyst added is kept about 0.1% by mass to 10% by mass of the amount of the cellulose. Two or more activators may be used in combination or an acid anhydride of carboxylic acid having 2 or more and 7 or less carbon atoms may also be added.

The amount of activator(s) added is preferably 5% by mass or more of the amount of the cellulose, more preferably 10% by mass or more, and particularly preferably 30% by mass or more. If the amount of activator(s) is larger than the above described minimum value, preferably troubles such that the degree of activating the cellulose is lowered will not occur. The maximum amount of activator(s) added is not particularly limited, as long as it does not decrease the productivity; however, preferably the amount is 100 times the amount of the cellulose or less, in terms of mass, more preferably 20 times the amount of the cellulose or less, and particularly preferably 10 times the amount of the cellulose or less. Activation may be carried out by adding excess activator(s) to the cellulose and then decreasing the amount of the activator(s) through the operation of filtration, air drying, heat drying, distillation under reduced pressure or solvent replacement.

The activation duration is preferably 20 minutes or longer. The maximum duration is not particularly limited, as long as it does not affect the productivity; however, the duration is preferably 72 hours or shorter, more preferably 24 hours or shorter and particularly preferably 12 hours or shorter. The activation temperature is preferably 0° C. or higher and 90° C. or lower, more preferably 15° C. or higher and 80° C. or lower, and particularly preferably 20° C. or higher and 60° C. or lower. The process of the cellulose activation can also be carried out under pressure or reduced pressure. As a heating device, electromagnetic wave such as micro wave or infrared ray may be used.

(Acylation)

In the method for producing a cellulose acylate in the present invention, preferably the hydroxyl group of cellulose is acylated by adding an acid anhydride of carboxylic acid to the cellulose to react them in the presence of a Bronsted acid or Lewis acid catalyst.

As a method for obtaining a cellulose-mixed acylate, any one of the methods can be used in which two kinds of carboxylic anhydrides, as acylating agents, are added in the mixed state or one by one to react with cellulose; in which a mixed acid anhydride of two kinds of carboxylic acids (e.g. acetic acid-propionic acid-mixed acid anhydride) is used; in which a carboxylic acid and an acid anhydride of another carboxylic acid (e.g. acetic acid and propionic anhydride) are used as raw materials to synthesize a mixed acid anhydride (e.g. acetic acid-propionic acid-mixed acid anhydride) in the reaction system and the mixed acid anhydride is reacted with cellulose; and in which first a cellulose acylate whose substitution degree is lower than 3 is synthesized and the remaining hydroxyl group is acylated using an acid anhydride or an acid halide.

(Acid Anhydride)

Acid anhydrides of carboxylic acids preferably used are those of carboxylic acids having 2 or more and 7 or less carbon atoms, which include: for example, acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexanecarboxylic anhydride and benzoic anhydride. More preferably used are acetic anhydride, propionic anhydride, butyric anhydride, valeric anhydride, hexanoic anhydride and heptanoic anhydride. And particularly preferably used are acetic anhydride, propionic anhydride and butyric anhydride.

To prepare a mixed ester, it is preferable to use two or more of these acid anhydrides in combination. Preferably, the mixing ratio of such acid anhydrides is determined depending on the substitution ratio of the mixed ester. Usually, excess equivalent of acid anhydride(s) is added to cellulose. Specifically, preferably 1.2 to 50 equivalents, more preferably 1.5 to 30 equivalents, and particularly preferably 2 to 10 equivalents of acid anhydride(s) is added to the hydroxyl group of cellulose.

(Catalyst)

As an acylation catalyst for the production of a cellulose acylate in the present invention, preferably a Bronsted acid or a Lewis acid is used. The definitions of Bronsted acid and Lewis acid are described in, for example, "Rikagaku Jiten (Dictionary of Physics and Chemistry)" $5^{th}$ edition (2000). Examples of preferred Bronsted acids include: sulfuric acid, perchloric acid, phosphoric acid and methanesulfonic acid, benzenesulfonic acid and p-toluenesulfonic acid. Examples of preferred Lewis acids include: zinc chloride, tin chloride, antimony chloride and magnesium chloride.

As the catalyst, sulfuric acid and perchloric acid are preferable, and sulfuric acid is particularly preferable. The amount of the catalyst added is preferably 0.1 to 30% by mass of the amount of cellulose, more preferably 1 to 15% by mass, and particularly preferably 3 to 12% by mass.

(Solvent)

When carrying out acylation, a solvent may be added to the reaction mixture so as to adjust the viscosity, reaction speed, ease of stirring or acyl substitution ratio of the reaction mixture. As such a solvent, dichloromethane, chloroform, a carboxylic acid, acetone, ethyl methyl ketone, toluene, dimethyl sulfoxide or sulfolane can be used. Preferably, a carboxylic acid is used. Examples of carboxylic acids include: for example, those having 2 or more and 7 or less carbon atoms, such as acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, and cyclopentanecarboxylic acid. Preferable are acetic acid, propionic acid and butyric acid. Tow or more of these solvents may be used in the form of a mixture.

(Acylation Conditions)

The acylation may be carried out in such a manner that a mixture of acid anhydride(s), catalyst and, if necessary, solvent(s) is prepared first and then the mixture is mixed with cellulose, or acid anhydride(s), catalyst and, if necessary, solvent(s) are mixed with cellulose one after another. Generally, it is preferable that a mixture of acid anhydride(s) and catalyst or a mixture of acid anhydride(s), catalyst and solvent(s) is prepared first and then the mixture, as an acylating agent, is reacted with cellulose. To suppress the temperature increase in the reactor due to the heat of reaction generated in the acylation, it is preferable to cool such an acylating agent in advance. The cooling temperature is preferably −50° C. to 20° C., more preferably −35° C. to 10° C., and particularly preferably −25° C. to 5° C. An acylating agent may be in the liquid state or in the frozen solid state when added. When added in the frozen solid state, the acylating agent may take the form of a crystal, flake or block.

Acylating agent(s) may be added to cellulose at one time or in installments. Or cellulose may be added to acylating agent(s) at one time or in installments. When adding acylating agent(s) in installments, either a single acylating agent or a plurality of acylating agents each having different compositions may be used. Preferred examples are: 1) adding a mixture of acid anhydride(s) and solvent(s) first and then adding catalyst; 2) adding a mixture of acid anhydride(s), solvent(s) and part of catalyst first and then adding a mixture of the rest of catalyst and solvent(s); 3) adding a mixture of acid anhydride(s) and solvent(s) first and then adding a mixture of catalyst and solvent(s); and 4) adding solvent(s) first and then adding a mixture of acid anhydride(s) and catalyst or a mixture of acid anhydride(s), catalyst and solvent(s).

In the method for producing a cellulose acylate of the present invention, the maximum temperature the reaction system reaches in the acylation is preferably 50° C. or lower, though the acylation of cellulose is exothermic reaction. The reaction temperature 50° C. or lower is preferable because it can prevent depolymerization from progressing, thereby avoiding such a trouble that a cellulose acylate having a polymerization degree suitable for the purpose of the present invention is hard to obtain. The maximum temperature the reaction system reaches in the acylation is preferably 45° C. or lower, more preferably 40° C. or lower, and particularly preferably 35° C. or lower. The reaction temperature may be controlled with a temperature control unit or by controlling the initial temperature of the acylating agent used. The reaction temperature can also be controlled by reducing the pressure in the reactor and utilizing the vaporization heat of the liquid component in the reaction system. Since the exothermic heat in the acylation is larger at the beginning of the reaction, the temperature control can be carried out by cooling the reaction system at the beginning and heating the same afterward. The end point of the acylation can be determined by means of the light transmittance, solvent viscosity, temperature change in the reaction system, solubility of the reaction product in an organic solvent or observation with a polarizing microscope.

The minimum temperature in the reaction is preferably −50° C. or higher, more preferably −30° C. or higher, and particularly preferably −20° C. or higher. Acylation duration is preferably 0.5 hours or longer and 24 hours or shorter, more preferably 1 hour or longer and 12 hours or shorter, and particularly preferably 1.5 hours or longer and 6 hours or shorter. If the duration is 0.5 hours or shorter, the reaction does not sufficiently progress under normal reaction conditions, while if the duration is longer than 24 hours, industrial production of a cellulose acylate is not preferably performed.

(Reaction Terminator)

In the method for producing a cellulose acylate used in the present invention, it is preferable to add a reaction terminator after the acylation reaction.

Any reaction terminator may be used, as long as it can decompose acid anhydride(s). Examples of preferred reaction terminators include: water, alcohols (e.g. ethanol, methanol, propanol and isopropyl alcohol), and compositions including the same. The reaction terminators may include a neutralizer as described later. In the addition of a reaction terminator, it is preferable not to add water or an alcohol directly, but to add a mixture with a carboxylic acid such as acetic acid, propionic acid or butyric acid, particularly preferably acetic acid, and water. Doing so prevents the generation of exothermic heat beyond the cooling ability of the reaction unit, thereby avoiding troubles such as decrease in polymerization degree of the cellulose acylate and precipitation of the cellulose acylate in the undesirable form. A carboxylic acid and water can be used at an arbitrary ratio; however, preferably the water content of the mixture is 5% by mass to 80% by mass, more preferably 10% by mass to 60% by mass, and particularly preferably 15% by mass to 50% by mass.

The reaction terminator may be added to the acylation reactor, or the reactants may be added to the container containing the reaction terminator. Preferably, the addition of the reaction terminator is performed spending 3 minutes to 3 hours. The reason for this is that if the time spent on the addition of the reaction terminator is 3 minutes or longer, it is possible to prevent too large an exothermic heat, thereby avoiding troubles, such as decrease in polymerization degree of the cellulose acylate, insufficient hydrolysis of acid anhydride(s), or decrease in stability of the cellulose acylate. And if the time spent on the addition of the reaction terminator is 3 hours or shorter, it is possible to avoid troubles such as decrease in industrial productivity. The time spent on the addition of the reaction terminator is preferably 4 minutes or longer and 2 hours or shorter, more preferably 5 minutes or longer and 1 hour or shorter, and much more preferably 10 minutes or longer and 45 minutes or shorter. The reactor not necessarily requires cooling when the reaction terminator is added; however, to suppress the progress of depolymerization, it is preferable to retard the temperature increase in the reactor by cooling the same. In this respect, cooling the reaction terminator before its addition is also preferable.

(Neutralizer)

In the acylation reaction termination step or after the acylation reaction termination step, to hydrolyze excess carboxylic anhydride remaining in the reaction system or neutralize part of or the whole carboxylic acid and esterifying catalyst in the same, a neutralizer (e.g. carbonate, acetate, hydroxide or oxide of calcium, magnesium, iron, aluminum or zinc) or its solution may be added. Preferred solvents for such a neutralizer include: for example, polar solvents such as water, alcohols (e.g. ethanol, methanol, propanol and isopropyl alcohol), carboxylic acids (e.g. acetic acid, propionic acid and butyric acid), ketones (e.g. acetone and ethyl methyl ketone) and dimethyl sulfoxide; and mixed solvents thereof.

(Partial Hydrolysis)

In the cellulose acylate thus obtained, the sum of the substitution degrees is approximately 3. Then, to obtain a cellulose acylate with desired substitution degree, generally the obtained cellulose acylate is kept at 20 to 90° C. in the presence of a small amount of catalyst (generally acylating catalyst such as remaining sulfuric acid) and water for several minutes to several days so that the ester linkage is partially hydrolyzed and the substitution degree of the acyl group of the cellulose acylate is decreased to a desired degree (so called aging). Since the sulfate ester of cellulose also undergoes hydrolysis during the process of the above partial hydrolysis, the amount of the sulfate ester bound to cellulose can also be decreased by controlling the hydrolysis conditions.

Preferably, the catalyst remaining in the reaction system is completely neutralized with a neutralizer as described above or the solution thereof at the time when a desired cellulose acylate is obtained so as to terminate the partial hydrolysis. It is also preferable to add a neutralizer which forms a salt slightly soluble in the reaction solution (e.g. magnesium carbonate and magnesium acetate) to effectively remove the catalyst (e.g. sulfuric ester) in the solution or bound to the cellulose.

(Filtration)

To remove the unreacted matter, slightly soluble salts or other contaminants in the cellulose acylate or to reduce the amount thereof, it is preferable to filter the reaction mixture (dope). The filtration may be carried out in any step after the completion of acylation and before the reprecipitation of the same. To control the filtration pressure or the handleability of the cellulose acylate, it is preferable to dilute the cellulose acylate with an appropriate solvent prior to filtration.

(Reprecipitation)

An intended cellulose acylate can be obtained by: mixing the cellulose acylate solution thus obtained into a poor solvent, such as water or an aqueous solution of a carboxylic acid (e.g. acetic acid and propionic acid), or mixing such a poor solvent into the cellulose acylate solution, to precipitate the cellulose acylate; washing the precipitated cellulose acylate; and subjecting the washed cellulose acylate to stabilization treatment. The reprecipitation may be performed continuously or in a batchwise operation. It is preferable to control the form of the reprecipitated cellulose acylate or the molecular weight distribution of the same by adjusting the concentration of the cellulose acylate solution and the composition of the poor solvent used according to the substitution pattern or the substitution degree of the cellulose acylate.

(Washing)

Preferably, the produced cellulose acylate undergoes washing treatment. Any washing solvent can be used, as long as it slightly dissolves the cellulose acylate and can remove impurities; however, generally water or hot water is used. The temperature of the washing water is preferably 25° C. to 100° C., more preferably 30° C. to 90° C., and particularly preferably 40° C. to 80° C. Washing may be carried out in so-called batch process where filtration and replacement are repeated or with continuous washing equipment. It is preferable to reuse, as a poor solvent, the liquid waste generated during the processes of reprecipitation and washing or to recover and reuse the solvent such as carboxylic acid by use of means such as distillation.

The progress of washing may be traced by any means; however, preferred means of tracing include: for example, hydrogen ion concentration, ion chromatography, electrical conductivity, ICP, elemental analysis, and atomic absorption spectrometry.

The catalyst (e.g. sulfuric acid, perchloric acid, trifluoroacetic acid, p-toluenesulfonic acid, methanesulfonic acid or zinc chloride), neutralizer (e.g. carbonate, acetate, hydroxide or oxide of calcium, magnesium, iron, aluminum or zinc), reaction product of the neutralizer and the catalyst, carboxylic acid (e.g. acetic acid, propionic acid or butyric acid), reaction product of the neutralizer and the carboxylic acid, etc. in the cellulose acylate can be removed by this washing treatment. This is highly effective in enhancing the stability of the cellulose acylate.

(Stabilization)

To improve the stability of the cellulose acylate and reduce the odor of the carboxylic acid, it is preferable to treat the cellulose acylate having been washed with hot water with an aqueous solution of weak alkali (e.g. carbonate, hydrogencarbonate, hydroxide or oxide of sodium, potassium calcium, magnesium or aluminum).

The amount of the residual purities can be controlled by the amount of washing solution, the temperature or time of washing, the method of stirring, the shape of washing container, or the composition or concentration of stabilizer. In the present invention, the conditions of acylation, partial hydrolysis and washing are set so that the residual sulfate group (on the basis of the sulfur atom content) is 0 to 500 ppm.

(Drying)

In the present invention, to adjust the water content of the cellulose acylate to a desirable value, it is preferable to dry the cellulose acylate. Any drying method can be employed to dry the cellulose acylate, as long as an intended water content can be obtained; however, it is preferable to carry out drying efficiently by either any one of the means such as heating, blast, pressure reduction and stirring alone or two or more of them in combination. The drying temperature is preferably 0 to 200° C., more preferably 40 to 180° C., and particularly preferably 50 to 160° C. The water content of the cellulose acylate of the present invention is preferably 2% by mass or less, more preferably 1% by mass or less, and particularly preferably 0.7% by mass or less.

(Form)

The cellulose acylate of the present invention can take various forms, such as particle, powder, fiber and bulk forms. However, as a raw material for films, the cellulose acylate is preferably in the particle form or in the powder form. Thus, the cellulose acylate after drying may be crushed or sieved to make the particle size uniform or improve the handleability. When the cellulose acylate is in the particle form, preferably 90% by mass or more of the particles used has a particle size of 0.5 to 5 mm. Further, preferably 50% by mass or more of the particles used has a particle size of 1 to 4 mm. Preferably, the particles of the cellulose acylate have a shape as close to a sphere as possible. And the apparent density of the cellulose acylate particles of the present invention is preferably 0.5 to 1.3, more preferably 0.7 to 1.2, and particularly preferably 0.8 to 1.15. The method for measuring the apparent density is specified in JIS K-7365.

The cellulose acylate particles of the present invention preferably have an angle of repose of 10 to 70 degrees, more preferably 15 to 60 degrees, and particularly preferably 20 to 50 degrees.

(Degree of Polymerization)

The average degree of polymerization of the cellulose acylate preferably used in the present invention is 100 to 300, preferably 120 to 250, and much more preferably 130 to 200. The average degree of polymerization can be determined by intrinsic viscosity method by Uda et al. (Kazuo Uda and Hideo Saitoh, Journal of the Society of Fiber Science and Technology, Japan, Vol. 18, No. 1, 105-120, 1962) or by the molecular weight distribution measurement by gel permeation chromatography (GPC). The determination of average degree of polymerization is described in detail in Japanese Patent Application Laid-Open No. 9-95538.

In the present invention, the weight average degree of polymerization/number average degree of polymerization of the cellulose acylate determined by GPC is preferably 1.6 to 3.6, more preferably 1.7 to 3.3, and much more preferably 1.8 to 3.2.

Of the above described kinds of cellulose acylate, either one kind alone or two or more kinds in combination may be used. Cellulose acylate properly mixed with a polymer ingredient other than cellulose acylate may also be used. The polymer ingredient mixed with cellulose acylate is preferably such that it is highly compatible with cellulose ester and its mixture with cellulose acylate, when formed into a film, has a transmission of 80% or more, preferably 90% or more and much more preferably 92% or more.

[Examples of Cellulose Acylate Synthesis]

Examples of cellulose acylate syntheses will be described in detail below; however, it should be understood that these examples are not intended to limit the present invention.

Synthesis Example 1 (Synthesis of Cellulose Acetate Propionate)

150 g of cellulose (broadleaf pulp) and 75 g of acetic acid were taken into a 5 L separable flask equipped with a reflux unit, as a reactor, and vigorously stirred for 2 hours while heated in an oil bath whose temperature is adjusted to 60° C. The cellulose thus pretreated was swelled and crushed and in the form of fluff. The reactor was then placed in an iced water bath at 2° C. for 30 minutes so that the cellulose was cooled.

Separately, a mixture of 1545 g of propionic anhydride, as an acylating agent, and 10.5 g of sulfuric acid was prepared, and the mixture was cooled to −30° C. and added, at one time, to the reactor containing the above described pretreated cellulose. After 30 minutes had elapsed, the internal temperature of the reactor was controlled, by increasing the temperature outside the reactor gradually, so that it reached 25° C. two hours after the addition of the acylating agent. The reactor was then cooled in an iced water bath at 5° C., the internal temperature was controlled so that it reached 10° C. 0.5 hours after the addition of the acylating agent and 23° C. two hours after the same, and the reaction mixture was stirred for 3 hours while keeping the internal temperature at 23° C. The reactor was then cooled in an iced water bath at 5° C. and 120 g of water-containing 25% by mass acetic acid having been cooled to 5° C. was added over 1-hour period. The internal temperature of the reactor was increased to 40° C. and stirred for 1.5 hours. Then, a solution obtained by dissolving magnesium acetate tetrahydrate in an amount, on the mole basis, two times of the amount of sulfuric acid in 50% by mass water-containing acetic acid was added to the reactor and stirred for 30 minutes. Then, 1 L of water-containing 25% by mass acetic acid, 500 mL of water-containing 33% by mass acetic acid, 1 L of water-containing 50% by mass acetic acid and 1 L of water were added in this order to precipitate cellulose acetate propionate. The resultant precipitate of cellulose acetate propionate was washed with hot water. The washing conditions were varied as shown in Table 1 to obtain different kinds of cellulose acetate propionate with different amount of residual sulfate group. After washing, each cellulose acetate propionate was put into an aqueous solution of 0.005% by mass calcium hydroxide at 20° C., stirred for 0.5 hours, further washed with water until the pH of the wash liquid reaches 7, and vacuum dried at 70° C.

The 1H-NMR and GPC measurements revealed that the degree of acetylization, degree of propionization and degree of polymerization of the resultant cellulose acetate propionate were 0.30, 2.63 and 320, respectively. The content of sulfate group was determined in accordance with ASTM D-817-96.

Synthesis Example 2 (Synthesis of Cellulose Acetate Butyrate)

100 g of cellulose (broadleaf pulp) and 135 g of acetic acid were taken into a 5 L separable flask equipped with a reflux unit, as a reactor, and allowed to stand for 1 hour while heated in an oil bath whose temperature is adjusted to 60° C. Then the mixture was stirred vigorously for 1 hour while heated in an oil bath whose temperature is adjusted to 60° C. The cellulose thus pretreated was swelled and crushed and in the form of fluff. The reactor was then placed in an iced water bath at 5° C. for 1 hour so that the cellulose was fully cooled.

Separately, a mixture of 1080 g of butyric anhydride, as an acylating agent, and 10.0 g of sulfuric acid was prepared, and the mixture was cooled to −20° C. and added, at one time, to the reactor containing the above described pretreated cellulose. After 30 minutes had elapsed, the mixture was allowed to react for 5 hours by increasing the temperature outside the reactor to 20° C. The reactor was then cooled in an iced water bath at 5° C., and 2400 g of water-containing 12.5% by mass acetic acid having been cooled to about 5° C. was added over 1-hour period. The internal temperature of the reactor was increased to 30° C. and the mixture was stirred for 1 hour. Then, 100 g of 50% by mass aqueous solution of magnesium acetate tetrahydrate was added to the reactor and stirred for 30 minutes. Then, 1000 g of acetic acid and 2500 g of water-containing 50% by mass acetic acid were added little by little to precipitate cellulose acetate butyrate. The resultant precipitate of cellulose acetate butyrate was washed with hot water. The washing conditions were varied as shown in Table 1 to obtain different kinds of cellulose acetate butyrate with different amount of residual sulfate group. After washing, each cellulose acetate butyrate was put into an aqueous solution of 0.005% by mass calcium hydroxide, stirred for 0.5 hours, further washed with water until the pH of the wash liquid reaches 7, and vacuum dried at 70° C. The degree of acetylization, degree of butyrization and degree of polymerization of the resultant cellulose acetate butyrate were 0.84, 2.12 and 268, respectively.

(4) Other Additives
(i) Matting Agent

Preferably, fine particles are added as a matting agent. Examples of fine particles used in the present invention include: those of silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferable because they can decrease the turbidity of the cellulose acylate film. Fine particles of silicon dioxide are particularly preferable. Preferably, the fine particles of silicon dioxide have an average primary particle size of 20 nm or less and an apparent specific gravity of 70 g/liter or more. Those having an average primary particle size as small as 5 to 16 nm are more preferable, because they enable the haze of the film produced to be decreased. The apparent specific gravity is preferably 90 to 200 g/liter or more and more preferably 100 to 200 g/liter more. The larger the apparent specific gravity, the more preferable, because fine particles of silicon dioxide having a larger apparent specific gravity make it possible to prepare a dispersion of higher concentration, thereby improving the haze and the agglomerates.

These fine particles generally form secondary particles having an average particle size of 0.1 to 3.0 μm, which exist as agglomerates of primary particles in a film and form irregularities 0.1 to 3.0 μm in size on the film surface. The average secondary particle size is preferably 0.2 μm or more and 1.5 μm or less, more preferably 0.4 μm or more and 1.2 μm or less, and most preferably 0.6 μm or more and 1.1 μm or less. The primary particle size and the secondary particle size are determined by observing the particles in the film with a scanning electron microscope and using the diameter of the circle circumscribing each particle as a particle size. The average particle size is obtained by averaging the 200 determinations resulting from observation at different sites.

As fine particles of silicon dioxide, those commercially available, such as Aerosil R972, R972V, R974, R812, 200, 200V, 300, R202, OX50 and TT600 (manufactured by Nippon Aerosil Co., LTD), can be used. As fine particles of zirconium oxide, those on the market under the trade name of Aerosil R976 and R811 (manufactured by Nippon Aerosil Co., LTD) can be used.

Of these fine particles, Aerosil 200V and Aerosil R972V are particularly preferable, because they are fine particles of silicon dioxide having an average primary particle size of 20 nm or less and an apparent specific gravity of 70 g/liter more and they produce a large effect of reducing friction coefficient of the optical film produced while keeping the turbidity of the same low.

(ii) Other Additives

Various additives other than the above described matting agent, such as ultraviolet light absorbers (e.g. hydroxybenzophenone compounds, benzotriazole compounds, salicylate ester compounds and cyanoacrylate compounds), infrared absorbers, optical adjustors, surfactants and odor-trapping agents (e.g. amine), can be added to the cellulose acylate of the present invention. The materials preferably used are described in detail in Journal of Technical Disclosure Laid-Open No. 2001-1745 (issued on Mar. 15, 2001, Japan Institute of Invention and Innovation), pp. 17-22.

As infrared absorbers, for example, those described in Japanese Patent Application Laid-Open No. 2001-194522 can be used, while as ultraviolet light absorbers, for example, those described in Japanese Patent Application Laid-Open No. 2001-151901 can be used. Both the infrared absorber content and the ultraviolet light absorber content of the cellulose acylate are preferably 0.001 to 5% by mass.

Examples of optical adjustors include retardation adjustors. And those described in, for example, Japanese Patent Application Laid-Open Nos. 2001-166144, 2003-344655, 2003-248117 and 2003-66230 can be used. The use of such a retardation adjustor makes it possible to control the in-plane retardation (Re) and the retardation across the thickness (Rth) of the film produced. Preferably, the amount of the retardation adjustor added is 0 to 10% by weight, more preferably 0 to 8% by weight, and much more preferably 0 to 6% by weight.

(5) Physical Properties of Cellulose Acylate Mixture

The above described cellulose acylate mixtures (mixtures of cellulose acylate, plasticizer, stabilizer and other additives) preferably satisfy the following physical properties.

(i) Loss in Weight

In the thermoplastic cellulose acetate propionate composition of the present invention, the loss in weight on heating at 220° C. is 5% by weight or less. The term "loss in weight on heating" herein used means the loss in weight at 220° C. of a sample when the temperature of the sample is increased from room temperature at a temperature increasing rate of 10° C./min in an atmosphere of nitrogen gas. The loss in weight on heating of cellulose acylate can be 5% by weight or less by allowing cellulose acylate film to take the above described mixture form. The loss in weight on heating of a cellulose acylate mixture is more preferably 3% by weight or less and much more preferably 1% by weight or less. Keeping the loss in weight on heating of a cellulose acylate mixture in the above described range makes it possible to suppress the trouble occurring in the film formation (generation of air bubbles).

(ii) Melt Viscosity

In the thermoplastic cellulose acetate propionate composition of the present invention, preferably the melt viscosity at 220° C., $1\ \sec^{-1}$ is 100 to 1000 Pa·sec, more preferably 200 to 800 Pa·sec, and much more preferably 300 to 700 Pa·sec. Allowing the thermoplastic cellulose acetate propionate composition to have such a higher melt viscosity prevents the composition from being stretched under tension at the die outlet, thereby preventing the optical anisotropy (retardation) caused by stretch orientation from increasing. Such viscosity adjustment can be performed by any means. For example, the adjustment can be performed by adjusting the polymerization degree of cellulose acylate or the amount of an additive such as a plasticizer.

(6) Pelletization

Preferably, the above described cellulose acylate and additives are mixed and pelletized prior to melt film formation.

In pelletization, it is preferable to dry the cellulose acylate and additives in advance; however, if a vented extruder is used, the drying step can be omitted. When drying is performed, a drying method can be employed in which the cellulose acylate and additives are heated in a heating oven at 90° C. for 8 hours or more, though drying methods applicable in the present invention are not limited to this. Pelletization can be performed in such a manner that after melting the above described cellulose acylate and additives at temperatures of 150° C. or higher and 250° C. or lower on a twin-screw kneading extruder, the molten mixture is extruded in the form of noodles, and the noodle-shaped mixture is solidified in water, followed by cutting. Pelletization may also be performed by underwater cutting in which the above described cellulose acylate and additives are melted on an extruder and extruded through a ferrule directly in water, and cutting is performed in water while carrying out extrusion.

Any known extruder, such as single screw extruder, non-intermeshing counter-rotating twin-screw extruder, intermeshing counter-rotating twin-screw extruder, intermeshing corotating twin-screw extruder, can be used, as long as it enables melt kneading.

Preferably, the pellet size is such that the cross section is 1 mm² or larger and 300 mm² or smaller and the length is 1 mm or longer and 30 mm or shorter and more preferably the cross section is 2 mm² or larger and 100 mm² or smaller and the length is 1.5 mm or longer and 10 mm or shorter.

In pelletization, the above described additives may be fed through a raw material feeding opening or a vent located midway along the extruder.

The number of revolutions of the extruder is preferably 10 rpm or more and 1000 rpm or less, more preferably 20 rpm or more and 700 rpm or less, and much more preferably 30 rpm or more and 500 rpm or less. If the rotational speed is lower than the above described range, the residence time of the cellulose acylate and additives is increased, which undesirably causes heat deterioration of the mixture, and hence decrease in molecular weight and increase in color change to yellow. Further, if the rotational speed is higher than the above described range, molecule breakage by shear is more likely to occur, which gives rise to problems of decrease in molecular weight and increase in crosslinked gel.

The extrusion residence time in pelletization is preferably 10 seconds or longer and 30 minutes or shorter, more preferably 15 seconds or longer and 10 minutes or shorter, and much more preferably 30 seconds or longer and 3 minutes or shorter. As long as the resin mixture is sufficiently melt, shorter residence time is preferable, because shorter residence time enables the deterioration of resin or occurrence of yellowish color to be suppressed.

(7) Melt Film Formation (i) Drying

The cellulose acylate mixture palletized by the above described method is preferably used for the melt film formation, and the water content in the pellets is preferably decreased prior to the film formation.

In the present invention, to adjust the water content in the cellulose acylate to a desirable amount, it is preferable to dry the cellulose acylate. Drying is often carried out using an air dehumidification drier, but the method of drying is not limited to any specific one, as long as an intended water content is obtained (preferably drying is carried out efficiently by either any one of methods, such as heating, air blasting, pressure reduction and stirring, or two or more of them in combination, and more preferably a drying hopper having an insulating structure is used). The drying temperature is preferably 0 to 200° C., more preferably 40 to 180° C., and particularly preferably 60 to 150° C. Too low a drying temperature is not preferable, because if the drying temperature is too low, drying takes a longer time, and moreover, water content cannot be decreased to an intended value or lower. Too high a drying temperature is not preferable, either, because if the drying temperature is too high, the resin is adhere to cause blocking. The amount of drying air used is preferably 20 to 400 m³/hour, more preferably 50 to 300 m³/hour, and particularly preferably 100 to 250 m³/hour. Too small an amount of drying air is not preferable, because if the amount of drying air is too small, drying cannot be carried out efficiently. On the other hand, using too large an amount of drying air is not economical. This is because the drying effect cannot be drastically improved further even by using excess amount of drying air. The dew point of the air is preferably 0 to −60° C., more preferably −10 to −50° C., and particularly preferably −20 to −40° C. The drying time is required to be at least 15 minutes or longer, preferably 1 hour or longer and more preferably 2 hours or longer. However, the drying time exceeding 50 hours dose not drastically decrease the water content further and it might cause deterioration of the resin by heat. Thus, an unnecessarily long drying time is not preferable. In the cellulose acylate of the present invention, the water content is preferably 1.0% by mass or lower, more preferably 0.1% by mass or lower, and particularly preferably 0.01% by mass or lower.

(ii) Melt Extrusion

The above described cellulose acylate resin is fed into a cylinder via the feed opening of an extruder (different from the extruder used for the above described pelletization). The inside of the cylinder consists of: a feeding section where the cellulose acylate resin fed through the feed opening is transported in a fixed amount (area A); a compressing section where the cellulose acylate resin is melt-kneaded and compressed (area B); and a measuring section where the melt-kneaded and compressed cellulose acylate resin is measured (area C), from the feed opening side in this order. The resin is preferably dried by the above described method so as to decrease the water content; however, to prevent the molten resin from being oxidized by the remaining oxygen, more preferably extrusion is performed in a stream of inert gas (nitrogen etc.) or using a vented extruder while performing vacuum evacuation. The screw compression ratio of the extruder is set to 2.5 to 4.5 and the L/D to 20 to 70. The term "screw compression ratio" used herein means the volume ratio of the feeding section A to the measuring section C, in other words, the volume per unit length of the feeding section A the volume per unit length of the measuring section C, which is calculated using the outside diameter d1 of the screw shaft of the feeding section A, the outside diameter d2 of the screw shaft of the measuring section C, the diameter a1 of the channel of the feeding section A, and the diameter a2 of the channel of the measuring section C. The "L/D" means the ratio of the cylinder length to the cylinder inside diameter. The extrusion temperature is set to 190 to 240° C. When the temperature inside of the extruder exceeds 240° C., a cooling machine should be provided between the extruder and the die.

If the screw compression ratio is as small as less than 2.5, melt-kneading is not sufficiently performed, causing an unmolten part, or the magnitude of heat evolution by shear stress is too small to sufficiently fuse crystals, making fine crystals more likely to remain in the formed cellulose acylate film. Furthermore, the cellulose acylate film more likely contains air bubbles. As a result, the cellulose acylate film having decreased strength is produced, or in stretching of the cellulose acylate film, the remaining crystals inhibit the stretchability of the film, whereby the degree of film orientation cannot be sufficiently increased. Conversely, if the screw compression ratio is as high as more than 4.5, the magnitude of heat evolution by shear stress is so large that the resin becomes more likely to deteriorate, which makes the cellulose acylate film more likely to yellow. Further, too large shear stress causes molecule breakage, which results in decrease in molecular weight, and hence in mechanical strength of the film. Accordingly, to make the formed cellulose acylate film less likely to be yellow and less likely to break in stretching, the screw compression ratio is preferably in the range of 2.5 to 4.5, more preferably in the range of 2.8 to 4.2, and particularly preferably in the range of 3.0 to 4.0.

The L/D as low as less than 20 causes insufficient melting or insufficient kneading, which makes fine crystals more likely to remain in the formed cellulose acylate film, like the case where the compression ratio is too low. Conversely, the L/D as high as more than 70 makes too long the residence time of the cellulose acylate resin in the extruder, which makes the resin more likely to deteriorate. Too long a residence time may cause molecule breakage, which results in decrease in molecular weight, and hence in mechanical strength of the film. Accordingly, to make the formed cellulose acylate film less likely to be yellow and less likely to break in stretching, the L/D is preferably in the range of 20 to 70, more preferably in the range of 22 to 65, and particularly preferably in the range of 24 to 50.

The extrusion temperature is preferably set in the above described temperature range. The cellulose acylate film thus obtained has the following characteristics: a haze of 2.0% or less; and a yellow index (YI value) of 10 or less.

The haze herein used is an index of whether the extrusion temperature is too low or not, in other words, an index of the amount of the crystals remaining in the formed cellulose acylate film. When the haze is more than 2.0%, the strength of the formed cellulose acylate film is likely to deteriorate and the breakage of the film is likely to occur. On the other hand, the yellow index (YI value) is an index of whether the extrusion temperature is too high or not. When the yellow index (YI value) is 10 or less, the formed cellulose acylate film is free from the problem of yellowing.

As extruder, generally single-screw extruder, which requires lower equipment costs, is often used. Types of single-screw extruder include: for example, fullflight-type, Madock-type and Dulmage-type. For the cellulose acylate resin, which is relatively poor in heat stability, fullflight-type screw extruder is preferably used. Twin-screw extruder which is provided with a vent midway along its length, and therefore, makes it possible to perform extrusion while removing unnecessary volatile components can also be used by changing the screw segment, though it requires high equipment costs. Types of twin-screw extruder include: broadly, corotating type and counter-rotating type, and either of the types can be used. However, preferably used is a corotating type of twin-screw extruder which causes less residence of the resin and has a high self-cleaning performance. Twin-screw extruder is suitable for the film formation of cellulose acylate resin, because it makes possible extrusion at low temperatures due to its high kneading performance and high resin-feeding performance, though its equipment costs are high. In twin-extruder, if a vent opening is properly arranged, pellets or powder of cellulose acylate can be used in the undried state or the selvedges of the film produced in the course of the film formation can also be reused in the undried state.

The preferable diameter of the screw varies depending on the intended amount of the cellulose acylate resin extruded per unit time; however, it is preferably 10 mm or larger and 300 mm or smaller, more preferably 20 mm or larger and 250 mm or smaller, and much more preferably 30 mm or larger and 150 mm or smaller.

(iii) Filtration

To filter contaminants in the resin or avoid the damage to the gear pump caused by such contaminants, it is preferable to perform a so-called breaker-plate-type filtration which uses a filter medium provided at the extruder outlet. To filter contaminants with much higher precision, it is preferable to provide, after the gear pump, a filter in which a leaf-type disc filter is incorporated. Filtration can be performed with a single filtering section, or it can be multi-step filtration with a plurality of filtering sections. A filter medium with higher precision is preferably used; however, taking into consideration the pressure resistance of the filter medium or the increase in filtration pressure due to the clogging of the filter medium, the filtration precision is preferably 15 μm to 3 μm and more preferably 10 μm to 3 μm. A filter medium with higher precision is particularly preferably used when a leaf-type disc filter is used to perform final filtration of contaminants. And in order to ensure suitability of the filter medium used, the filtration precision may be adjusted by the number of filter media loaded, taking into account the pressure resistance and filter life. From the viewpoint of being used at high temperature and high pressure, the type of the filter medium used is preferably a steel material. Of the steel materials, stainless steel or steel is particularly preferably used. From the viewpoint of corrosion, desirably stainless steel is used. A filter medium constructed by weaving wires or a sintered filter medium constructed by sintering, for example, metal long fibers or metal powder can be used. However, from the viewpoint of filtration precision and filter life, a sintered filter medium is preferably used.

(iv) Gear Pump

To improve the thickness precision, it is important to decrease the fluctuation in the amount of the discharged resin and it is effective to provide a gear pump between the extruder and the die to feed a fixed amount of cellulose acylate resin through the gear pump. A gear pump is such that it includes a pair of gears—a drive gear and a driven gear—in mesh, and it drives the drive gear to rotate both the gears in mesh, thereby sucking the molten resin into the cavity through the suction opening formed on the housing and discharging a fixed amount of the resin through the discharge opening formed on the same housing. Even if there is a slight change in the resin pressure at the tip of the extruder, the gear pump absorbs the change, whereby the change in the resin pressure in the downstream portion of the film forming apparatus is kept very small, and the fluctuation in the film thickness is improved. The use of a gear pump makes it possible to keep the fluctuation of the resin pressure at the die within the range of ±1%.

To improve the fixed-amount feeding performance of the gear pump, a method can also be used in which the pressure before the gear pump is controlled to be constant by varying the number of revolution of the screw. Or the use of a high-precision gear pump is also effective in which three or more gears are used to eliminate the fluctuation in gear of a gear pump.

Other advantages of using a gear pump are such that it makes possible the film formation while reducing the pressure at the tip of the screw, which would be expected to reduce the energy consumption, prevent the increase in resin temperature, improve the transportation efficiency, decrease in the residence time of the resin in the extruder, and decrease the L/D of the extruder. Furthermore, when a filter is used to remove contaminants, if a gear pump is not used, the amount of the resin fed from the screw can sometimes vary with increase in filtration pressure. However, this variation in the amount of resin fed from the screw can be eliminated by using a gear pump. On the other hand, disadvantages of using a gear pump are such that: it may increase the length of the equipment used, depending on the selection of equipment, which results in a longer residence time of the resin in the equipment; and the shear stress generated at the gear pump portion may cause the breakage of molecule chains. Thus, care must be taken when using a gear pump.

Preferably, the residence time of the resin, from the time the resin enters the extruder through the feed opening to the time it goes out of the die, is 2 minutes or longer and 60 minutes or shorter, more preferably 3 minutes or longer and 40 minutes or shorter, and much more preferably 4 minutes or longer and 30 minutes or shorter.

If the flow of polymer circulating around the bearing of the gear pump is not smooth, the seal by the polymer at the driving portion and the bearing portion becomes poor, which may cause the problem of producing wide fluctuations in measurements and feeding and extruding pressures. Thus, the gear pump (particularly clearances thereof) should be designed to match to the melt viscosity of the cellulose acylate resin. In some cases, the portion of the gear pump where the cellulose acylate resin resides can be a cause of the resin's deterioration. Thus, preferably the gear pump has a structure which allows the residence time of the cellulose acylate resin to be as short as possible. The polymer tubes or adaptors that connect the extruder with a gear pump or a gear pump with the die should be so designed that they allow the residence time of the cellulose acylate resin to be as short as possible. Furthermore, to stabilize the extrusion pressure of the cellulose acylate whose melt viscosity is highly temperature-dependent, preferably the fluctuation in temperature is kept as narrow as possible. Generally, a band heater, which requires lower equipment costs, is often used for heating polymer tubes; however, it is more preferable to use a cast-in aluminum heater which is less susceptible to temperature fluctuation. Further, to allow $G'$, $G''$, $\tan \delta$, $\eta$ to have the maximum and the minimum in the extruder as described above, it is preferable to melt the cellulose acylate resin by heating the barrel of the extruder with heater divided into 3 or more and 20 or less.

(v) Die

With the extruder constructed as above, the cellulose acylate is melted and continuously fed into a die, if necessary, through a filter or gear pump. Any type of commonly used die, such as T-die, fish-tail die or hanger coat die, may be used, as long as it allows the residence time of the molten resin to be short. Further, a static mixer can be introduced right before the T-die to increase the temperature uniformity. The clearance at the outlet of the T-die can be 1.0 to 5.0 times the film thickness, preferably 1.2 to 3 times the film thickness, and more preferably 1.3 to 2 times the film thickness. If the lip clearance is less than 1.0 time the film thickness, it is difficult to obtain a sheet whose surface state is good. Conversely, if the lip clearance is more than 5.0 times the film thickness, undesirably the thickness precision of the sheet is decreased. A die is very important equipment which determines the thickness precision of the film to be formed, and thus, one that can severely control the film thickness is preferably used. Although commonly used dies can control the film thickness at intervals of 40 to 50 mm, dies of a type which can control the film thickness at intervals of 35 mm or less and more preferably at intervals of 25 mm or less are preferable. In the cellulose acylate resin, since its melt viscosity is highly temperature-dependent and shear-rate-dependent, it is important to design a die that causes the least possible temperature uniformity and the least possible flow-rate uniformity across the width. The use of an automated thickness adjusting die, which measures the thickness of the film downstream, calculates the thickness deviation and feeds the calculated result back to the thickness adjustment, is also effective in decreasing fluctuations in thickness in the long-term continuous production of the cellulose acylate film.

In producing films, a single-layer film forming apparatus, which requires lower producing costs, is generally used. However, depending on the situation, it is also possible to use a multi-layer film forming apparatus to produce a film having 2 types or more of structure, in which an outer layer is formed as a functional layer. Generally, preferably a functional layer is laminated thin on the surface of the cellulose acylate film, but the layer-layer ratio is not limited to any specific one.

(vi) Cast

The molten resin extruded in the form of a sheet from the die in the above described manner is cooled and solidified on cooling drums to obtain a film. In this cooling and solidifying operation, preferably the adhesion of the extruded sheet of the molten resin to the cooling drums is enhanced by any of the methods, such as electrostatic application method, air-knife method, air-chamber method, vacuum-nozzle method or touch-roll method. These adhesion enhancing methods may be applied to either the whole surface or part of the surface of the sheet resulting from melt extrusion. A method, called as edge pinning, in which cooling drums are adhered to the edges of the film alone is often employed, but the adhesion enhancing method used in the present invention is not limited to this method.

Preferably, the molten resin sheet is cooled little by little using a plurality of cooling drums. Generally, such cooling is often performed using 3 cooling drums, but the number of cooling drums used is not limited to 3. The diameter of the cooling drums is preferably 100 mm or larger and 1000 mm or smaller and more preferably 150 mm or larger and 1000 mm or smaller. The spacing between the two adjacent drums of the plurality of drums is preferably 1 mm or larger and 50 mm or smaller and more preferably 1 mm or larger and 30 mm or smaller, in terms of face-face spacing.

The temperature of cooling drums is preferably 60° C. or higher and 160° C. or lower, more preferably 70° C. or higher and 150° C. or lower, and much more preferably 80° C. or higher and 140° C. or lower. The cooled and solidified sheet is then stripped off from the cooling drums, passed through take-off rollers (a pair of nip rollers), and wound up. The wind-up speed is preferably 10 m/min or higher and 100 m/min or lower, more preferably 15 m/min or higher and 80 m/min or lower, and much more preferably 20 m/min or higher and 70 m/min or lower.

The width of the film thus formed is preferably 0.7 m or more and 5 m or less, more preferably 1 m or more and 4 m or less, and much more preferably 1.3 m or more and 3 m or less. The thickness of the unstretched film thus obtained is preferably 30 μm or more and 400 μm or less, more preferably 40 μm or more and 300 μm or less, and much more preferably 50 μm or more and 200 μm or less.

When so-called touch roll method is used, the surface of the touch roll used may be made of resin, such as rubber or Teflon, or metal. A roll, called as flexible roll, can also be used whose surface gets a little depressed by the pressure of a metal roll having a decreased thickness when the flexible roll and the metal roll touch with each other, and their pressure contact area is increased.

The temperature of the touch roll is preferably 60° C. or higher and 160° C. or lower, more preferably 70° C. or higher and 150° C. or lower, and much more preferably 80° C. or higher and 140° C. or lower.

(vii) Winding Up

Preferably, the sheet thus obtained is wound up with its edges trimmed away. The portions having been trimmed off may be reused as a raw material for the same kind of film or a different kind of film, after undergoing grinding or after undergoing granulation, or depolymerization or re-polymerization depending on the situation. Any type of trimming cutter, such as a rotary cutter, shearing blade or knife, may be used. The material of the cutter may be either carbon steel or stainless steel. Generally, a carbide-tipped blade or ceramic blade is preferably used, because use of such a blade makes the life of a cutter longer and suppresses the production of cuttings.

It is also preferable, from the viewpoint of preventing the occurrence of scratches on the sheet, to provide, prior to winding up, a laminating film at least on one side of the sheet. Preferably, the wind-up tension is 1 kg/m (in width) or higher and 50 kg/m (in width) or lower, more preferably 2 kg/m (in width) or higher and 40 kg/m (in width) or lower, and much more preferably 3 kg/m (in width) or higher and 20 kg/m (in width) or lower. If the wind-up tension is lower than 1 kg/m (in width), it is difficult to wind up the film uniformly. Conversely, if the wind-up tension is higher than 50 kg/m (in width), undesirably the film is too tightly wound, whereby the appearance of wound film deteriorates, and the knot portion of the film is stretched due to the creep phenomenon, causing surging in the film, or residual double refraction occurs due to the extension of the film. Preferably, the winding up is performed while detecting the wind-up tension with a tension control provided midway along the line and controlling the same to be constant. When there is a difference in the film temperature depending on the spot on the film forming line, a slight difference in the film length can sometimes be created due to thermal expansion, and thus, it is necessary to adjust the draw ratio of the nip rolls so that tension higher than a prescribed one should not be applied to the film.

Preferably, the winding up of the film is performed while tapering the amount of the film to be wound according to the winding diameter so that a proper wind-up tension is kept, though it can be performed while keeping the wind-up tension constant by the control with the tension control. Generally, the wind-up tension is decreased little by little with increase in the winding diameter; however, it can sometimes be preferable to increase the wind-up tension with increase in the winding diameter.

(viii) Physical Properties of Unstretched Cellulose Acylate Film

In the unstretched cellulose acylate film thus obtained, preferably Re=0 to 20 nm and Rth=0 to 80 nm, more preferably Re=0 to 15 nm and Rth=0 to 70 nm, and much more preferably Re=0 to 10 nm and Rth=0 to 60 nm. Re and Rth represent in-plane retardation and across-the-thickness retardation, respectively. Re is measured using KOBRA 21ADH (manufactured by Oji Scientific Instruments) while allowing light to enter the unstretched cellulose acylate film normal to its surface. Rth is calculated based on three retardation measurements: the Re measured as above, and the Res measured while allowing light to enter the film from the direction inclined at angles of +40°, −40°, respectively, to the direction normal to the film using the slow axis in plane as a tilt axis (rotational axis). Preferably, the angle θ between the direction of the film formation (across the length) and the slow axis of the Re of the film is made as close to 0°, +90° or −90° as possible.

The total light transmittance is preferably 90% to 100%, more preferably 91% to 99%, and much more preferably 92% to 98%. Preferably, the haze is 0 to 1%, more preferably 0 to 0.8% and much more preferably 0 to 0.6%.

Preferably, the thickness non-uniformity both in the longitudinal direction and the transverse direction is 0% or more and 4% or less, more preferably 0% or more and 3% or less, and much more preferably 0% or more and 2% or less.

Preferably, the modulus in tension is 1.5 kN/mm$^2$ or more and 3.5 kN/mm$^2$ or less, more preferably 1.7 kN/mm or more and 2.8 kN/mm$^2$ or less, and much more preferably 1.8 kN/mm$^2$ or more and 2.6 kN/mm$^2$ or less.

Preferably, the breaking extension is 3% or more and 100% or less, more preferably 5% or more and 80% or less, and much more preferably 8% or more and 50% or less.

Preferably, the Tg (this indicates the Tg of the film, that is, the Tg of the mixture of cellulose acylate and additives) is 95° C. or higher and 145° C. or lower, more preferably 100° C. or higher and 140° C. or lower, and much more preferably 105° C. or higher and 135° C. or lower.

Preferably, the dimensional change by heat at 80° C. per day is 0% or higher ±1% or less both in the longitudinal direction and the transverse direction, more preferably 0% or higher ±0.5% or less, and much more preferably 0% or higher ±0.3% or less.

Preferably, the water permeability at 40° C., 90% rh is 300 g/m$^2$·day or higher and 1000 g/m$^2$·day or lower, more preferably 400 g/m²·day or higher and 900 g/m² day or lower, and much more preferably 500 g/m²·day or higher and 800 g/m² day or lower.

Preferably, the average water content at 25° C., 80% rh is 1% by weight or higher and 4% by weight or lower, more preferably 1.2% by weight or higher and 3% by weight or lower, and much more preferably 1.5% by weight or higher and 2.5% by weight or lower.

(8) Stretching

The film formed by the above described process may be stretched. The Re and Rth of the film can be controlled by stretching.

Preferably, stretching is carried out at temperatures of Tg or higher and Tg+50° C. or lower, more preferably at temperatures of Tg+3° C. or higher and Tg+30° C. or lower, and much more preferably at temperatures of Tg+5° C. or higher and Tg+20° C. or lower. Preferably, the stretch magnification is 1% or higher and 300% or lower at least in one direction, more preferably 2% or higher and 250% or lower, and much more preferably 3% or higher and 200% or lower. The stretching can be performed equally in both longitudinal and transverse directions; however, preferably it is performed unequally so that the stretch magnification in one direction is larger than that of the other direction. Either the stretch magnification in the longitudinal direction (MD) or that in the transverse direction (TD) may be made larger. Preferably, the smaller value of the stretch magnification is 1% or more and 30% or less, more preferably 2% or more and 25% or less, and much more preferably 3% or more and 20% or less. Preferably, the larger one is 30% or more and 300% or less, more preferably 35% or more and 200% or less, and much more preferably 40% or more and 150% or less. The stretching operation can be carried out in one step or in a plurality of steps. The term "stretch magnification" used herein means the value obtained using the following equation.

Stretch magnification (%)=100×{(length after stretching)−(length before stretching)}/(length before stretching)

The stretching may be performed in the longitudinal direction by using 2 or more pairs of nip rolls and controlling the peripheral velocity of the pairs of nip rolls so that the velocity of the pair on the outlet side is faster than that of the other one(s) (longitudinal stretching) or in the transverse direction (in the direction perpendicular to the longitudinal direction) while allowing both ends of the film to be gripped by a chuck (transverse stretching). Further, the stretching may be performed using the simultaneous biaxial stretching method described in Japanese Patent Application Laid-Open Nos. 2000-37772, 2001-113591 and 2002-103445.

In the longitudinal stretching, the Re-to-Rth ratio can be freely controlled by controlling the value obtained by dividing the distance between two pairs of nip rolls by the width of the film (length-to-width ratio). In other words, the ratio Rth/Re can be increased by decreasing the length-to-width ratio. Further, Re and Rth can also be controlled by combining the longitudinal stretching and the transverse stretching. In other words, Re can be decreased by decreasing the difference between the percent of longitudinal stretch and the percent of the transverse stretch, while Re can be increased by increasing the difference between the same.

Preferably, the Re and Rth of the cellulose acylate film thus stretched satisfy the following formulas, $Rth \geq Re$ $200 \geq Re \geq 0$ $500 \geq Rth \geq 30$, more preferably $Rth \geq Re \times 1.1$ $150 \geq Re \geq 10$ $400 \geq Rth \geq 50$, and much more preferably $Rth \geq Re \times 1.2$ $100 \geq Re \geq 20$ $350 \geq Rth \geq 80$.

Preferably, the angle θ between the film forming direction (longitudinal direction) and the slow axis of Re of the film is as close to 0°, +90° or −90° as possible. Specifically, in the longitudinal stretching, preferably the angle θ is as close to 0° as possible, and it is preferably 0±3°, more preferably 0±20 and much more preferably 0±1°. In the transverse stretching, the angle θ is preferably 90±30 or −90±30, more preferably 90±2° or −90±2°, and much more preferably 90±10 or −90±1°.

Preferably, the thickness of the cellulose acylate film after stretching is 15 μm or more and 200 μm or less, more preferably 30 μm or more and 170 μm or less, and much more preferably 40 μm or more and 140 μm or less. Preferably, the thickness non-uniformity is 0% or more and 3% or less in both the longitudinal and transverse directions, more preferably 0% or more and 2% or less, and much more preferably 0% or more and 1% or less.

The physical properties of the stretched cellulose acylate film are preferably in the following range.

Preferably, the modulus in tension is 1.5 kN/mm² or more and less than 3.0 kN/mm², more preferably 1.7 kN/mm² or more and 2.8 kN/mm² or less, and much more preferably 1.8 kN/mm² or more and 2.6 kN/mm² or less.

Preferably, the breaking extension is 3% or more and 100% or less, more preferably 5% or more and 80% or less, and much more preferably 8% or more and 50% or less.

Preferably, the Tg (this indicates the Tg of the film, that is, the Tg of the mixture of cellulose acylate and additives) is 95° C. or higher and 145° C. or lower, more preferably 100° C. or higher and 140° C. or lower, and much more preferably 105° C. or higher and 135° C. or lower.

Preferably, the dimensional change by heat at 80° C. per day is 0% or higher ±1% or less both in the longitudinal direction and the transverse direction, more preferably 0% or higher ±0.5% or less, and much more preferably 0% or higher ±0.3% or less.

Preferably, the water permeability at 40° C., 90% is 300 g/m²·day or higher and 1000 g/m²·day or lower, more preferably 400 g/m²·day or higher and 900 g/m²·day or lower, and much more preferably 500 g/m²·day or higher and 800 g/m² day or lower.

Preferably, the average water content at 25° C., 80% rh is 1% by weight or higher and 4% by weight or lower, more preferably 1.2% by weight or higher and 3% by weight or lower, and much more preferably 1.5% by weight or higher and 2.5% by weight or lower.

The thickness is preferably 30 μm or more and 200 μm or less, more preferably 40 μm or more and 180 μm or less, and much more preferably 50 μm or more and 150 μm or less.

The haze is 0% or more and 3% or less, more preferably 0% or more and 2% or less, and much more preferably 0% or more and 1% or less.

The total light transmittance is preferably 90% or higher and 100% or lower, more preferably 91% or higher and 99% or lower, and much more preferably 92% or higher and 98% or lower.

(9) Surface Treatment

The adhesion of both unstretched and stretched cellulose acylate films to each functional layer (e.g. undercoat layer and back layer) can be improved by subjecting them to surface treatment. Examples of types of surface treatment applicable include: treatment using glow discharge, ultraviolet irradiation, corona discharge, flame, or acid or alkali. The glow discharge treatment mentioned herein may be treatment using low-temperature plasma generated in a low-pressure gas at $10^{-3}$ to 20 Torr. Or plasma treatment at atmospheric pressure is also preferable. Plasma excitation gases are gases that undergo plasma excitation under the above described conditions, and examples of such gases include: argon, helium, neon, krypton, xenon, nitrogen, carbon dioxide, flons such as tetrafluoromethane, and the mixtures thereof. These are described in detail in Journal of Technical Disclosure (Laid-Open No. 2001-1745, issued on Mar. 15, 2001, by Japan Institute of Invention and Innovation), 30-32. In the plasma treatment at atmospheric pressure, which has attracted considerable attention in recent years, for example, irradiation energy of 20 to 500 Kgy is used at 10 to 1000 Kev, and preferably irradiation energy of 20 to 300 Kgy is used at 30 to 500 Kev. Of the above described types of treatment, most preferable is alkali saponification, which is extremely effective as surface treatment for cellulose acylate films. Specific examples of such treatment applicable include: those described in Japanese Patent Application Laid-Open Nos. 2003-3266, 2003-229299, 2004-322928 and 2005-76088.

Alkali saponification may be carried out by immersing the film in a saponifying solution or by coating the film with a saponifying solution. The saponification by immersion can be achieved by allowing the film to pass through a bath, in which an aqueous solution of NaOH or KOH with pH of 10 to 14 has been heated to 20° C. to 80° C., over 0.1 to 10 minutes, neutralizing the same, water-washing the neutralized film, followed by drying.

The saponification by coating can be carried out using a coating method such as dip coating, curtain coating, extrusion coating, bar coating or E-coating. A solvent for alkali-saponification solution is preferably selected from solvents that allow the saponifying solution to have excellent wetting characteristics when the solution is applied to a transparent substrate; and allow the surface of a transparent substrate to be kept in a good state without causing irregularities on the surface. Specifically, alcohol solvents are preferable, and isopropyl alcohol is particularly preferable. An aqueous solution of surfactant can also be used as a solvent. As an alkali for the alkali-saponification coating solution, an alkali soluble in the above described solvent is preferable, and KOH or NaOH is more preferable. The pH of the alkali-saponification coating solution is preferably 10 or more and more preferably 12 or more. Preferably, the alkali saponification reaction is carried at room temperature for 1 second or longer and 5 minutes or shorter, more preferably for 5 seconds or longer and 5 minutes or shorter, and particularly preferably for 20 seconds or longer and 3 minutes or shorter. It is preferable to wash the saponifying solution-coated surface with water or an acid and wash the surface with water again after the alkali saponification reaction. The coating-type saponification and the removal of orientation layer described later can be performed continuously, whereby the number of the producing steps can be decreased. The details of these saponifying processes are described in, for example, Japanese Patent Application Laid-Open No. 2002-82226 and WO 02/46809.

To improve the adhesion of the unstretched or stretched cellulose acylate film to each functional layer, it is preferable to provide an undercoat layer on the cellulose acylate film. The undercoat layer may be provided after carrying out the above described surface treatment or without the surface treatment. The details of the undercoat layers are described in Journal of Technical Disclosure (Laid-Open No. 2001-1745, issued on Mar. 15, 2001, by Japan Institute of Invention and Innovation), 32.

These surface-treatment step and under-coat step can be incorporated into the final part of the film forming step, or they can be performed independently, or they can be performed in the functional-layer providing process.

(10) Providing Functional Layer

Preferably, the stretched and unstretched cellulose acylate films of the present invention are combined with any one of the functional layers described in detail in Journal of Technical Disclosure (Laid-Open No. 2001-1745, issued on Mar. 15, 2001, by Japan Institute of Invention and Innovation), 32-45. Particularly preferable is providing a polarizing layer (polarizer), optical compensation layer (optical compensation film), antireflection layer (antireflection film) or hard coat layer.

(i) Providing Polarizing Layer (Preparation of Polarizer)

[Materials Used for Polarizing Layer]

At the present time, generally, commercially available polarizing layers are prepared by immersing stretched polymer in a solution of iodine or a dichroic dye in a bath so that the iodine or dichroic dye penetrates into the binder. Coating-type of polarizing films, represented by those manufactured by Optiva Inc., are also available as a polarizing film. Iodine or a dichroic dye in the polarizing film develops polarizing properties when its molecules are oriented in a binder. Examples of dichroic dyes applicable include: azo dye, stilbene dye, pyrazolone dye, triphenylmethane dye, quinoline dye, oxazine dye, thiazine dye and anthraquinone dye. The dichroic dye used is preferably water-soluble. The dichroic dye used preferably has a hydrophilic substitute (e.g. sulfo, amino, or hydroxyl). Example of such dichroic dyes includes: compounds described in Journal of Technical Disclosure, Laid-Open No. 2001-1745, 58, (issued on Mar. 15, 2001, by Japan Institute of Invention and Innovation).

Any polymer which is crosslinkable in itself or which is crosslinkable in the presence of a crosslinking agent can be used as a binder for polarizing films. And more than one combination thereof can also be used as a binder. Examples of binders applicable include: compounds described in Japanese Patent Application Laid-Open No. 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate. Silane coupling agents can also be used as a polymer. Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol having different polymerization degrees in combination is particularly preferable. The saponification degree of polyvinyl alcohol is preferably 70 to 100% and more preferably 80 to 100%. The polymerization degree of polyvinyl alcohol is preferably 100 to 5000. Details of denatured polyvinyl alcohol are described in Japanese Patent Application Laid-Open Nos. 8-338913, 9-152509 and 9-316127. For polyvinyl alcohol and denatured polyvinyl alcohol, two or more kinds may be used in combination.

Preferably, the minimum of the binder thickness is 10 μm. For the maximum of the binder thickness, from the viewpoint of light leakage of liquid crystal displays, preferably the binder has the smallest possible thickness. The thickness of the binder is preferably equal to or smaller than that of currently commercially available polarizer (about 30 μm), more preferably 25 μm or smaller, and much more preferably 20 μm or smaller.

The binder for polarizing films may be crosslinked. Polymer or monomer that has a crosslinkable functional group may be mixed into the binder. Or a crosslinkable functional group may be provided to the binder polymer itself. Crosslinking reaction is allowed to progress by means of light, heat or pH changes, and a binder having a crosslinked structure can be formed by crosslinking reaction. Examples of crosslinking agents applicable are described in U.S. Pat. (Reissued) No. 23,297. Boron compounds (e.g. boric acid and borax) may also be used as a crosslinking agent. The amount of the crosslinking agent added to the binder is preferably 0.1 to 20% by mass of the binder. This allows polarizing devices to have good orientation characteristics and polarizing films to have good damp heat resistance.

The amount of the unreacted crosslinking agent after completion of the crosslinking reaction is preferably 1.0% by mass or less and more preferably 0.5% by mass or less. Restraining the unreacted crosslinking agent to such an amount improves the weatherability of the binder.

[Stretching of Polarizing Film]

Preferably, a polarizing film is dyed with iodine or a dichroic dye after undergoing stretching (stretching process) or rubbing (rubbing process).

In the stretching process, preferably the stretching magnification is 2.5 to 30.0 and more preferably 3.0 to 10.0. Stretching can be dry stretching, which is performed in the air. Stretching can also be wet stretching, which is performed while immersing a film in water. The stretching magnification in the dry stretching is preferably 2.5 to 5.0, while the stretching magnification in the wet stretching is preferably 3.0 to 10.0. Stretching may be performed parallel to the MD direction (parallel stretching) or in an oblique (oblique stretching). These stretching operations may be performed at one time or in several installments. Stretching can be performed more uniformly even in high-ratio stretching if it is performed in several installments. Oblique stretching in which stretching is performed in an oblique while tilting a film at an angle of 10 degrees to 80 degrees is more preferable.

(I) Parallel Stretching Process

Prior to stretching, a PVA film is swelled. The degree of swelling is 1.2 to 2.0 (ratio of mass before swelling to mass after swelling). After this swelling operation, the PVA film is stretched in a water-based solvent bath or in a dye bath in which a dichroic substance is dissolved at a bath temperature of 15 to 50° C., preferably 17 to 40° C. while continuously conveying the film via a guide roll etc. Stretching can be accomplished in such a manner as to grip the PVA film with 2 pairs of nip rolls and control the conveying speed of nip rolls so that the conveying speed of the latter pair of nip rolls is higher than that of the former pair of nip rolls. The stretching magnification is based on the length of PVA film after stretching/the length of the same in the initial state ratio (hereinafter the same), and from the viewpoint of the above described advantages, the stretching magnification is preferably 1.2 to 3.5 and more preferably 1.5 to 3.0. After this stretching operation, the film is dried at 50° C. to 90° C. to obtain a polarizing film.

(II) Oblique Stretching Process

Oblique stretching can be performed by the method described in Japanese Patent Application Laid-Open No. 2002-86554 in which a tenter that projects on a tilt is used. This stretching is performed in the air; therefore, it is necessary to allow a film to contain water so that the film is easy to stretch. Preferably, the water content in the film is 5% or higher and 100% or lower, the stretching temperature is 40° C. or higher and 90° C. or lower, and the humidity during the stretching operation is preferably 50% rh or higher and 100% rh or lower.

The absorbing axis of the polarizing film thus obtained is preferably 10 degrees to 80 degrees, more preferably 30 degrees to 60 degrees, and much more preferably substantially 45 degrees (40 degrees to 50 degrees).

[Lamination]

The above described stretched and unstretched cellulose acylate films having undergone saponification and the polarizing layer prepared by stretching are laminated to prepare a polarizer. They may be laminated in any direction, but preferably they are laminated so that the angle between the direction of the film casting axis and the direction of the polarizer stretching axis is 0 degree, 45 degrees or 90 degrees.

Any adhesive can be used for the lamination. Examples of adhesives applicable include: PVA resins (including denatured PVA such as acetoacetyl, sulfonic, carboxyl or oxyalkylen group) and aqueous solutions of boron compounds. Of these adhesives, PVA resins are preferable. The thickness of the adhesive layer is preferably 0.01 to 10 μm and particularly preferably 0.05 to 5 μm, on a dried layer basis.

Examples of configurations of laminated layers are as follows:

a. A/P/A
b. A/P/B
c. A/P/T
d. B/P/B
e. B/P/T where A represents an unstretched film of the present invention, B a stretched film of the present invention, T a cellulose triacetate film (Fujitack), and P a polarizing layer. In the configurations a, b, A and B may be cellulose acetate having the same composition, or they may be different. In the configuration d, two Bs may be cellulose acetate having the same composition, or they may be different, and their stretching rates may be the same or different. When sheets of polarizer are used as an integral part of a liquid crystal display, they may be integrated into the display with either side of them facing the liquid crystal surface; however, in the configurations b, e, preferably B is allowed to face the liquid crystal surface.

In the liquid crystal displays into which sheets of polarizer are integrated, usually a substrate including liquid crystal is arranged between two sheets of polarizer; however, the sheets of polarizer of a to e of the present invention and commonly used polarizer (T/P/T) can be freely combined. On the outermost surface of a liquid crystal display, however, preferably a transparent hard coat layer, an anti-glare layer, antireflection layer and the like is provided, and as such a layer, any one of layers described later can be used.

Preferably, the sheets of polarizer thus obtained have a high light transmittance and a high degree of polarization. The light transmittance of the polarizer is preferably in the range of 30 to 50% at a wavelength of 550 nm, more preferably in the range of 35 to 50%, and most preferably in the range of 40 to 50%. The degree of polarization is preferably in the range of 90 to 100% at a wavelength of 550 nm, more preferably in the range of 95 to 100%, and most preferably in the range of 99 to 100%.

The sheets of polarizer thus obtained can be laminated with a λ/4 plate to create circularly polarized light. In this case, they are laminated so that the angle between the slow axis of the λ/4 plate and the absorbing axis of the polarizer is 45 degrees. Any λ/4 plate can be used to create circularly polarized light; however, preferably one having such wavelength-dependency that retardation is decreased with decrease in wavelength is used. More preferably, a polarizing film having an absorbing axis which tilts 20 degrees to 70 degrees in the longitudinal direction and a λ/4 plate that includes an optically anisotropic layer made up of a liquid crystalline compound are used.

These sheets of polarizer may include a protective film laminated on one side and a separate film on the other side. Both protective film and separate film are used for protecting sheets of polarizer at the time of their shipping, inspection and the like.

(ii) Providing Optical Compensation Layer (Preparation of Optical Compensation Film)

An optically anisotropic layer is used for compensating the liquid crystalline compound in a liquid crystal cell in black display by a liquid crystal display. It is prepared by forming an orientation film on each of the stretched and unstretched cellulose acylate films and providing an optically anisotropic layer on the orientation film.

[Orientation Film]

An orientation film is provided on the above described stretched and unstretched cellulose acylate films which have undergone surface treatment. This film has the function of specifying the orientation direction of liquid crystalline molecules. However, this film is not necessarily indispensable constituent of the present invention. This is because a liquid crystalline compound plays the role of the orientation film, as long as the oriented state of the liquid crystalline compound is fixed after it undergoes orientation treatment. In other words, the sheets of polarizer of the present invention can also be prepared by transferring only the optically anisotropic layer on the orientation film, where the orientation state is fixed, on the polarizer.

An orientation film can be provided using a technique such as rubbing of an organic compound (preferably polymer), oblique deposition of an inorganic compound, formation of a micro-groove-including layer, or built-up of an organic compound (e.g. ω-tricosanic acid, dioctadecyl methyl ammonium chloride, methyl stearate) by Langmur-Blodgett technique (LB membrane). Orientation films in which orientation function is produced by the application of electric field, electromagnetic field or light irradiation are also known.

Preferably, the orientation film is formed by rubbing of polymer. As a general rule, the polymer used for the orientation film has a molecular structure having the function of orienting liquid crystalline molecules.

In the present invention, preferably the orientation film has not only the function of orienting liquid crystalline molecules, but also the function of combining a side chain having a crosslinkable functional group (e.g. double bond) with the main chain or the function of introducing a crosslinkable functional group having the function of orienting liquid crystalline molecules into a side chain.

Either polymer which is crosslinkable in itself or polymer which is crosslinkable in the presence of a crosslinking agent can be used for the orientation film. And a plurality of the combinations thereof can also be used. Examples of such polymer include: those described in Japanese Patent Application Laid-Open No. 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate. Silane coupling agents can also be used as a polymer. Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol having different polymerization degrees in combination is particularly preferable. The saponification degree of polyvinyl alcohol is preferably 70 to 100% and more preferably 80 to 100%. The polymerization degree of polyvinyl alcohol is preferably 100 to 5000.

Side chains having the function of orienting liquid crystal molecules generally have a hydrophobic group as a functional group. The kind of the functional group is determined depending on the kind of liquid crystalline molecules and the oriented state required. For example, a denatured group of denatured polyvinyl alcohol can be introduced by copolymerization denaturation, chain transfer denaturation or block polymerization denaturation. Examples of denatured groups include: hydrophilic groups (e.g. carboxylic, sulfonic, phosphonic, amino, ammonium, amide and thiol groups); hydrocarbon groups with 10 to 100 carbon atoms; fluorine-substituted hydrocarbon groups; thioether groups; polymerizable groups (e.g. unsaturated polymerizable groups, epoxy group, azirinyl group); and alkoxysilyl groups (e.g. trialkoxy, dialkoxy, monoalkoxy). Specific examples of these denatured polyvinyl alcohol compounds include: those described in Japanese Patent Application Laid-Open No. 2000-155216, columns [0022] to [0145], Japanese Patent Application Laid-Open No. 2002-62426, columns [0018] to [0022].

Combining a side chain having a crosslinkable functional group with the main chain of the polymer of an orientation film or introducing a crosslinkable functional group into a side chain having the function of orienting liquid crystal molecules makes it possible to copolymerize the polymer of the orientation film and the polyfunctional monomer contained in the optically anisotropic layer. As a result, not only the molecules of the polyfunctional monomer, but also the molecules of the polymer of the orientation film and those of the polyfunctional monomer and the polymer of the orientation film are covalently firmly bonded together. Thus, introduction of a crosslinkable functional group into the polymer of an orientation film enables remarkable improvement in the strength of optical compensation films.

The crosslinkable functional group of the polymer of the orientation film preferably has a polymerizable group, like the polyfunctional monomer. Specific examples of such crosslinkable functional groups include: those described in Japanese Patent Application Laid-Open No. 2000-155216, columns [0080] to [0100]. The polymer of the orientation film can be crosslinked using a crosslinking agent, besides the above described crosslinkable functional groups.

Examples of crosslinking agents applicable include: aldehyde; N-methylol compounds; dioxane derivatives; compounds that function by the activation of their carboxyl group; activated vinyl compounds; activated halogen compounds; isoxazol; and dialdehyde starch. Two or more kinds of crosslinking agents may be used in combination. Specific examples of such crosslinking agents include: compounds described in Japanese Patent Application Laid-Open No.

2002-62426, columns [0023] to [0024]. Aldehyde, which is highly reactive, particularly glutaraldehyde is preferably used as a crosslinking agent.

The amount of the crosslinking agent added is preferably 0.1 to 20% by mass of the polymer and more preferably 0.5 to 15% by mass. The amount of the unreacted crosslinking agent remaining in the orientation film is preferably 1.0% by mass or less and more preferably 0.5% by mass or less. Controlling the amount of the crosslinking agent and unreacted crosslinking agent in the above described manner makes it possible to obtain a sufficiently durable orientation film, in which reticulation does not occur even after it is used in a liquid crystal display for a long time or it is left in an atmosphere of high temperature and high humidity for a long time.

Basically, an orientation film can be formed by: coating the above described polymer, as a material for forming an orientation film, on a transparent substrate containing a crosslinking agent; heat drying (crosslinking) the polymer; and rubbing the same. The crosslinking reaction may be carried out at any time after the polymer is applied to the transparent substrate, as described above. When a water-soluble polymer, such as polyvinyl alcohol, is used as the material for forming an orientation film, the coating solution is preferably a mixed solvent of an organic solvent having an anti-foaming function (e.g. methanol) and water. The mixing ratio is preferably such that water:methanol=0:100 to 99:1 and more preferably 0:100 to 91:9. The use of such a mixed solvent suppresses the generation of foam, thereby significantly decreasing defects not only in the orientation film, but also on the surface of the optically anisotropic layer.

As a coating method for coating an orientation film, spin coating, dip coating, curtain coating, extrusion coating, rod coating or roll coating is preferably used. Particularly preferably used is rod coating. The thickness of the film after drying is preferably 0.1 to 10 µm. The heat drying can be carried out at 20° C. to 110° C. To achieve sufficient crosslinking, preferably the heat drying is carried out at 60° C. to 100° C. and particularly preferably at 80° C. to 100° C. The drying time can be 1 minute to 36 hours, but preferably it is 1 minute to 30 minutes. Preferably, the pH of the coating solution is set to a value optimal to the crosslinking agent used. When glutaraldehyde is used, the pH is 4.5 to 5.5 and particularly preferably 5.

The orientation film is provided on the stretched and unstretched cellulose acylate films or on the above described undercoat layer. The orientation film can be obtained by crosslinking the polymer layer and providing rubbing treatment on the surface of the polymer layer, as described above.

The above described rubbing treatment can be carried out using a treatment method widely used in the treatment of liquid crystal orientation in LCD. Specifically, orientation can be obtained by rubbing the surface of the orientation film in a fixed direction with paper, gauze, felt, rubber or nylon, polyester fiber and the like. Generally the treatment is carried out by repeating rubbing a several times using a cloth in which fibers of uniform length and diameter have been uniformly transplanted.

In the rubbing treatment industrially carried out, rubbing is performed by bringing a rotating rubbing roll into contact with a running film including a polarizing layer. The circularity, cylindricity and deviation (eccentricity) of the rubbing roll are preferably 30 µm or less respectively. The wrap angle of the film wrapping around the rubbing roll is preferably 0.1 to 90°. However, as described in Japanese Patent Application Laid-Open No. 8-160430, if the film is wrapped around the rubbing roll at 360° or more, stable rubbing treatment is ensured. The conveying speed of the film is preferably 1 to 100 ml/min. Preferably, the rubbing angle is properly selected from the range of 0 to 60°. When the orientation film is used in liquid crystal displays, the rubbing angle is preferably 40° to 50° and particularly preferably 45°.

The thickness of the orientation film thus obtained is preferably in the range of 0.1 to 10 µm.

Then, liquid crystalline molecules of the optically anisotropic layer are oriented on the orientation film. After that, if necessary, the polymer of the orientation film and the polyfunctional monomer contained in the optically anisotropic layer are reacted, or the polymer of the orientation film is crosslinked using a crosslinking agent.

The liquid crystalline molecules used for the optically anisotropic layer include: rod-shaped liquid crystalline molecules and discotic liquid crystalline molecules. The rod-shaped liquid crystalline molecules and discotic liquid crystalline molecules may be either high-molecular-weight liquid crystalline molecules or low-molecular-weight liquid crystalline molecules, and they include low-molecule liquid crystalline molecules which have undergone crosslinking and do not show liquid crystallinity any more.

[Rod-Shaped Liquid Crystalline Molecules]

Examples of rod-shaped liquid crystalline molecules preferably used include: azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles.

Rod-shaped liquid crystalline molecules also include metal complexes. Liquid crystal polymer that includes rod-shaped liquid crystalline molecules in its repeating unit can also be used as rod-shaped liquid crystalline molecules. In other words, rod-shaped liquid crystalline molecules may be bonded to (liquid crystal) polymer.

Rod-shaped liquid crystalline molecules are described in Kikan Kagaku Sosetsu (Survey of Chemistry, Quarterly), Vol. 22, Chemistry of Liquid Crystal (1994), edited by The Chemical Society of Japan, Chapters 4, 7 and 11 and in Handbook of Liquid Crystal Devices, edited by 142th Committee of Japan Society for the Promotion of Science, Chapter 3.

The index of birefringence of the rod-shaped liquid crystalline molecules is preferably in the range of 0.001 to 0.7. To allow the oriented state to be fixed, preferably the rod-shaped liquid crystalline molecules have a polymerizable group. As such a polymerizable group, a radically polymerizable unsaturated group or cationically polymerizable group is preferable. Specific examples of such polymerizable groups include: polymerizable groups and polymerizable liquid crystal compounds described in Japanese Patent Application Laid-Open No. 2002-62427, columns [0064] to [0086].

[Discotic Liquid Crystalline Molecules]

Discotic liquid crystalline molecules include: benzene derivatives described in the research report by C. Destrade et al., Mol. Cryst. Vol. 71, 111 (1981); truxene derivatives described in the research report by C. Destrade et al., Mol. Cryst. Vol. 122, 141 (1985) and Physics lett, A, Vol. 78, 82 (1990); cyclohexane derivatives described in the research report by B. Kohne et al., Angew. Chem. Vol. 96, 70 (1984); and azacrown or phenylacetylene macrocycles described in the research report by J. M. Lehn et al., J. Chem. Commun., 1794 (1985) and in the research report by J. Zhang et al., L. Am. Chem. Soc. Vol. 116, 2655 (1994).

Discotic liquid crystalline molecules also include liquid crystalline compounds having a structure in which straight-chain alkyl group, alkoxy group and substituted benzoyloxy group are substituted radially as the side chains of the mother nucleus at the center of the molecules. Preferably, the compounds are such that their molecules or groups of molecules have rotational symmetry and they can provide an optically anisotropic layer with a fixed orientation. In the ultimate state of the optically anisotropic layer formed of discotic liquid crystalline molecules, the compounds contained in the optically anisotropic layer are not necessarily discotic liquid crystalline molecules. The ultimate state of the optically anisotropic layer also contain compounds such that they are originally of low-molecular-weight discotic liquid crystalline molecules having a group reactive with heat or light, but undergo polymerization or crosslinking by heat or light, thereby becoming higher-molecular-weight molecules and losing their liquid crystallinity. Examples of preferred discotic liquid crystalline molecules are described in Japanese Patent Application Laid-Open No. 8-50206. And the details of the polymerization of discotic liquid crystalline molecules are described in Japanese Patent Application Laid-Open No. 8-27284.

To fix the discotic liquid crystalline molecules by polymerization, it is necessary to bond a polymerizable group, as a substitute, to the discotic core of the discotic liquid crystalline molecules. Compounds in which their discotic core and a polymerizable group are bonded to each other via a linking group are preferably used. With such compounds, the oriented state is maintained during the polymerization reaction. Examples of such compounds include: those described in Japanese Patent Application Laid-Open No. 2000-155216, columns [0151] to [0168].

In hybrid orientation, the angle between the long axis (disc plane) of the discotic liquid crystalline molecules and the plane of the polarizing film increases or decreases, across the depth of the optically anisotropic layer, with increase in the distance from the plane of the polarizing film. Preferably, the angle decreases with increase in the distance. The possible changes in angle include: continuous increase, continuous decrease, intermittent increase, intermittent decrease, change including both continuous increase and continuous decrease, and intermittent change including increase and decrease. The intermittent changes include the area midway across the thickness where the tilt angle does not change. Even if the change includes the area where the angle does not change, it does not matter as long as the angle increases or decreased as a whole. Preferably, the angle changes continuously.

Generally, the average direction of the long axis of the discotic liquid crystalline molecules on the polarizing film side can be adjusted by selecting the type of discotic liquid crystalline molecules or the material for the orientation film, or by selecting the method of rubbing treatment. On the other hand, generally the direction of the long axis (disc plane) of the discotic liquid crystalline molecules on the surface side (on the air side) can be adjusted by selecting the type of discotic liquid crystalline molecules or the type of the additives used together with the discotic liquid crystalline molecules. Examples of additives used with the discotic liquid crystalline molecules include: plasticizer, surfactant, polymerizable monomer, and polymer. The degree of the change in orientation in the long axis direction can also be adjusted by selecting the type of the liquid crystalline molecules and that of additives, like the above described cases.

[Other Compositions of Optically Anisotropic Layer]

Use of plasticizer, surfactant, polymerizable monomer, etc. together with the above described liquid crystalline molecules makes it possible to improve the uniformity of the coating film, the strength of the film and the orientation of liquid crystalline molecules. Preferably, such additives are compatible with the liquid crystalline molecules, and they can change the tilt angle of the liquid crystalline molecules or do not inhibit the orientation of the liquid crystalline molecules.

Examples of polymerizable monomers applicable include radically polymerizable or cationically polymerizable compounds. Preferable are radically polymerizable polyfunctional monomers which are copolymerizable with the above described polymerizable-group containing liquid crystalline compounds. Specific examples are those described in Japanese Patent Application Laid-Open No. 2002-296423, columns [0018] to [0020]. The amount of the above described compounds added is generally in the range of 1 to 50% by mass of the discotic liquid crystalline molecules and preferably in the range of 5 to 30% by mass.

Examples of surfactants include traditionally known compounds; however, fluorine compounds are particularly preferable. Specific examples of fluorine compounds include compounds described in Japanese Patent Application Laid-Open No. 2001-330725, columns [0028] to [0056].

Preferably, polymers used together with the discotic liquid crystalline molecules can change the tilt angle of the discotic liquid crystalline molecules.

Examples of polymers applicable include cellulose esters. Examples of preferred cellulose esters include those described in Japanese Patent Application Laid-Open No. 2000-155216, columns [0178]. Not to inhibit the orientation of the liquid crystalline molecules, the amount of the above described polymers added is preferably in the range of 0.1 to 10% by mass of the liquid crystalline molecules and more preferably in the range of 0.1 to 8% by mass.

The discotic nematic liquid crystal phase-solid phase transition temperature of the discotic liquid crystalline molecules is preferably 70 to 300° C. and more preferably 70 to 170° C.

[Formation of Optically Anisotropic Layer]

An optically anisotropic layer can be formed by coating the surface of the orientation film with a coating fluid that contains liquid crystalline molecules and, if necessary, polymerization initiator or any other ingredients described later.

As a solvent used for preparing the coating fluid, an organic solvent is preferably used. Examples of organic solvents applicable include: amides (e.g. N,N-dimethylformamide); sulfoxides (e.g. dimethylsulfoxide); heterocycle compounds (e.g. pyridine); hydrocarbons (e.g. benzene, hexane); alkyl halides (e.g. chloroform, dichloromethane, tetrachloroethane); esters (e.g. methyl acetate, butyl acetate); ketones (e.g. acetone, methyl ethyl ketone); and ethers (e.g. tetrahydrofuran, 1,2-dimethoxyethane). Alkyl halides and ketones are preferably used. Two or more kinds of organic solvent can be used in combination.

Such a coating fluid can be applied by a known method (e.g. wire bar coating, extrusion coating, direct gravure coating, reverse gravure coating or die coating method).

The thickness of the optically anisotropic layer is preferably 0.1 to 20 μm, more preferably 0.5 to 15 μm, and most preferably 1 to 10 μm.

[Fixation of Orientation State of Liquid Crystalline Molecules]

The oriented state of the oriented liquid crystalline molecules can be maintained and fixed. Preferably, the fixation is performed by polymerization. Types of polymerization include: heat polymerization using a heat polymerization initiator and photopolymerization using a photopolymerization initiator. For the fixation, photopolymerization is preferably used.

Examples of photopolymerization initiators include: α-carbonyl compounds (described in U.S. Pat. Nos. 2,367,661 and 2,367,670); acyloin ethers (described in U.S. Pat. No.

2,448,828); α-hydrocarbon-substituted aromatic acyloin compounds (U.S. Pat. No. 2,722,512); multi-nucleus quinone compounds (described in U.S. Pat. Nos. 3,046,127 and 2,951,758); combinations of triarylimidazole dimmer and p-aminophenyl ketone (described in U.S. Pat. No. 3,549,367); acridine and phenazine compounds (described in Japanese Patent Application Laid-Open No. 60-105667 and U.S. Pat. No. 4,239,850); and oxadiazole compounds (described in U.S. Pat. No. 4,212,970).

The amount of the photopolymerization initiators used is preferably in the range of 0.01 to 20% by mass of the solid content of the coating fluid and more preferably in the range of 0.5 to 5% by mass.

Light irradiation for the polymerization of liquid crystalline molecules is preferably performed using ultraviolet light.

Irradiation energy is preferably in the range of 20 mJ/cm$^2$ to 50 J/cm$^2$, more preferably 20 to 5000 mJ/cm$^2$, and much more preferably 100 to 800 mJ/cm$^2$. To accelerate the photopolymerization, light irradiation may be performed under heat.

A protective layer may be provided on the surface of the optically anisotropic layer.

Combining the optical compensation film with a polarizing layer is also preferable. Specifically, an optically anisotropic layer is formed on a polarizing film by coating the surface of the polarizing film with the above described coating fluid for an optically anisotropic layer. As a result, thin polarlizer, in which stress generated with the dimensional change of polarizing film (distorsion×cross-sectional area×modulus of elasticity) is small, can be prepared without using a polymer film between the polarizing film and the optically anisotropic layer. Installing the polarizer according to the present invention in a large-sized liquid crystal display device enables high-quality images to be displayed without causing problems such as light leakage.

Preferably, stretching is performed while keeping the tilt angle of the polarizing layer and the optical compensation layer to the angle between the transmission axis of the two sheets of polarizer laminated on both sides of a liquid crystal cell constituting LCD and the longitudinal or transverse direction of the liquid crystal cell. Generally the tilt angle is 45°. However, in recent years, transmissive-, reflective-, and semi-transmissive-liquid crystal display devices have been developed in which the tilt angle is not always 45°, and thus, it is preferable to adjust the stretching direction arbitrarily to the design of each LCD.

[Liquid Crystal Display Devices]

Liquid crystal modes in which the above described optical compensation film is used will be described.

(TN-Mode Liquid Crystal Display Devices)

TN-mode liquid crystal display devices are most commonly used as a color TFT liquid crystal display device and described in a large number of documents. The oriented state in a TN-mode liquid crystal cell in the black state is such that the rod-shaped liquid crystalline molecules stand in the middle of the cell while the rod-shaped liquid crystalline molecules lie near the substrates of the cell.

(OCB-Mode Liquid Crystal Display Devices)

An OCB-mode liquid crystal cell is a bend orientation mode liquid crystal cell where the rod-shaped liquid crystalline molecules in the upper part of the liquid cell and those in the lower part of the liquid cell are oriented in substantially opposite directions (symmetrically). Liquid crystal displays using a bend orientation mode liquid crystal cell are disclosed in U.S. Pat. Nos. 4,583,825 and 5,410,422. A bend orientation mode liquid crystal cell has a self-compensation function since the rod-shaped liquid crystalline molecules in the upper part of the liquid cell and those in the lower part are symmetrically oriented. Thus, this liquid crystal mode is also referred to as OCB (Optically Compensatory Bend) liquid crystal mode.

Like in the TN-mode cell, the oriented state in an OCB-mode liquid crystal cell in the black state is also such that the rod-shaped liquid crystalline molecules stand in the middle of the cell while the rod-shaped liquid crystalline molecules lie near the substrates of the cell.

(VA-Mode Liquid Crystal Display Devices)

VA-mode liquid crystal cells are characterized in that in the cells, rod-shaped liquid crystalline molecules are oriented substantially vertically when no voltage is applied. The VA-mode liquid crystal cells include: (1) a VA-mode liquid crystal cell in a narrow sense where rod-shaped liquid crystalline molecules are oriented substantially vertically when no voltage is applied, while they are oriented substantially horizontally when a voltage is applied (Japanese Patent Application Laid-Open No. 2-176625); (2) a MVA-mode liquid crystal cell obtained by introducing multi-domain switching of liquid crystal into a VA-mode liquid crystal cell to obtain wider viewing angle, (SID 97, Digest of Tech. Papers (Proceedings) 28 (1997) 845), (3) a n-ASM-mode liquid crystal cell where rod-shaped liquid crystalline molecules undergo substantially vertical orientation when no voltage is applied, while they undergo twisted multi-domain orientation when a voltage is applied (Proceedings 58 to 59 (1998), Symposium, Japanese Liquid Crystal Society); and (4) a SURVAIVAL-mode liquid crystal cell (reported in LCD international 98).

(IPS-Mode Liquid Crystal Display Devices)

IPS-mode liquid crystal cells are characterized in that in the cells, rod-shaped liquid crystalline molecules are oriented substantially horizontally in plane when no voltage is applied and switching is performed by changing the orientation direction of the crystal in accordance with the presence or absence of application of voltage. Specific examples of IPS-mode liquid crystal cells applicable include those described in Japanese Patent Application Laid-Open Nos. 2004-365941, 2004-12731, 2004-215620, 2002-221726, 2002-55341 and 2003-195333.

(Other Modes of Liquid Crystal Display Devices)

In ECB-mode, STN (Supper Twisted Nematic)-mode, FLC (Ferroelectric Liquid Crystal)-mode, AFLC (Anti-ferroelectric Liquid Crystal)-mode, and ASM (Axially Symmetric Aligned Microcell)-mode cells, optical compensation can also be achieved with the above described logic. These cells are effective in any of the transmissive-, reflective-, and semi-transmissive-liquid crystal display devices. These are also advantageously used as an optical compensation sheet for GH (Guest-Host)-mode reflective liquid crystal display devices.

Examples of practical applications in which the cellulose derivative films described so far are used are described in Journal of Technical Disclosure (Laid-Open No. 2001-1745, Mar. 15, 2001, issued by Japan Institute of Invention and Innovation), 45-59.

Providing Antireflection Layer (Antireflection Film)

Generally an antireflection film is made up of: a low-refractive-index layer which also functions as a stainproof layer; and at least one layer having a refractive index higher than that of the low-refractive-index layer (i.e. high-refractive-index layer and/or intermediate-refractive-index layer) provided on a transparent substrate.

Methods of forming a multi-layer thin film as a laminate of transparent thin films of inorganic compounds (e.g. metal oxides) having different refractive indices include: chemical vapor deposition (CVD); physical vapor deposition (PVD); and a method in which a film of a colloid of metal oxide particles is formed by sol-gel process from a metal compound such as a metal alkoxide and the formed film is subjected to post-treatment (ultraviolet light irradiation: Japanese Patent Application Laid-Open No. 9-157855, plasma treatment: Japanese Patent Application Laid-Open No. 2002-327310).

On the other hand, there are proposed a various antireflection films, as highly productive antireflection films, which are formed by coating thin films of a matrix and inorganic particles dispersing therein in a laminated manner.

There is also provided an antireflection film including an antireflection layer provided with anti-glare properties, which is formed by using an antireflection film formed by coating as described above and providing the outermost surface of the film with fine irregularities.

The cellulose acylate film of the present invention is applicable to antireflection films formed by any of the above described methods, but particularly preferable is the antireflection film formed by coating (coating type antireflection film).

[Layer Configuration of Coating-Type Antireflection Film]

An antireflection film having at least on its substrate a layer construction of: intermediate-refractive-index layer, high-refractive-index layer and low-refractive-index layer (outermost layer) in this order is designed to have a refractive index satisfying the following relationship.

Refractive index of high-refractive-index layer>refractive index of intermediate-refractive-index layer>refractive index of transparent substrate>refractive index of low-refractive-index layer, and a hard coat layer may be provided between the transparent substrate and the intermediate-refractive-index layer.

The antireflection film may also be made up of: intermediate-refractive-index hard coat layer, high-refractive-index layer and low-refractive-index layer.

Examples of such antireflection films include: those described in Japanese Patent Application Laid-Open Nos. 8-122504, 8-110401, 10-300902, 2002-243906 and 2000-111706. Other functions may also be imparted to each layer. There are proposed, for example, antireflection films that include a stainproofing low-refractive-index layer or antistatic high-refractive-index layer (e.g. Japanese Patent Application Laid-Open Nos. 10-206603 and 2002-243906).

The haze of the antireflection film is preferably 5% or less and more preferably 3% or less. The strength of the film is preferably H or higher, by pencil hardness test in accordance with JIS K5400, more preferably 2H or higher, and most preferably 3H or higher.

[High-Refractive-Index Layer and Intermediate-Refractive-Index Layer]

The layer of the antireflection film having a high refractive index consists of a curable film that contains: at least ultrafine particles of high-refractive-index inorganic compound having an average particle size of 100 nm or less; and a matrix binder.

Fine particles of high-refractive-index inorganic compound include: for example, those of inorganic compounds having a refractive index of 1.65 or more and preferably 1.9 or more. Specific examples of such inorganic compounds include: oxides of Ti, Zn, Sb, Sn, Zr, Ce, Ta, La or In; and composite oxides containing these metal atoms.

Methods of forming such ultra-fine particles include: for example, treating the particle surface with a surface treatment agent (e.g. a silane coupling agent, Japanese Patent Application Laid-Open Nos. 11-295503, 11-153703, 2000-9908, an anionic compound or organic metal coupling agent, Japanese Patent Application Laid-Open No. 2001-310432 etc.); allowing particles to have a core-shell structure in which a core is made up of high-refractive-index particle(s) (Japanese Patent Application Laid-Open No. 2001-166104 etc.); and using a specific dispersant together (Japanese Patent Application Laid-Open No. 11-153703, U.S. Pat. No. 6,210,858B1, Japanese Patent Application Laid-Open No. 2002-2776069, etc.).

Materials used for forming a matrix include: for example, conventionally known thermoplastic resins and curable resin films.

Further, as such a material, at least one composition is preferable which is selected from the group consisting of: a composition including a polyfunctional compound that has at least two radically polymerizable and/or cationically polymerizable group; an organic metal compound containing a hydrolytic group; and a composition as a partially condensed product of the above organic metal compound. Examples of such materials include: compounds described in Japanese Patent Application Laid-Open Nos. 2000-47004, 2001-315242, 2001-31871 and 2001-296401.

A curable film prepared using a colloidal metal oxide obtained from the hydrolyzed condensate of metal alkoxide and a metal alkoxide composition is also preferred. Examples are described in Japanese Patent Application Laid-Open No. 2001-293818.

The refractive index of the high-refractive-index layer is generally 1.70 to 2.20. The thickness of the high-refractive-index layer is preferably 5 nm to 10 μm and more preferably 10 nm to 1 μm.

The refractive index of the intermediate-refractive-index layer is adjusted to a value between the refractive index of the low-refractive-index layer and that of the high-refractive-index layer. The refractive index of the intermediate-refractive-index layer is preferably 1.50 to 1.70.

[Low-Refractive-Index Layer]

The low-refractive-index layer is formed on the high-refractive-index layer sequentially in the laminated manner. The refractive index of the low-refractive-index layer is 1.20 to 1.55 and preferably 1.30 to 1.50.

Preferably, the low-refractive-index layer is formed as the outermost layer having scratch resistance and stainproofing properties. As means of significantly improving scratch resistance, it is effective to provide the surface of the layer with slip properties, and conventionally known thin film forming means that includes introducing silicone or fluorine is used.

The refractive index of the fluorine-containing compound is preferably 1.35 to 1.50 and more preferably 1.36 to 1.47. The fluorine-containing compound is preferably a compound that includes a crosslinkable or polymerizable functional group containing fluorine atom in an amount of 35 to 80% by mass.

Examples of such compounds include: compounds described in Japanese Patent Application Laid-Open No. 9-222503, columns [0018] to [0026], Japanese Patent Application Laid-Open No. 11-38202, columns [0019] to [0030], Japanese Patent Application Laid-Open No. 2001-40284, columns [0027] to [0028], Japanese Patent Application Laid-Open No. 2000-284102, etc.

A silicone compound is preferably such that it has a polysiloxane structure, it includes a curable or polymerizable functional group in its polymer chain, and it has a crosslinking structure in the film. Examples of such silicone compounds include: reactive silicone (e.g. SILAPLANE manufactured by Chisso Corporation); and polysiloxane having a silanol group on each of its ends (one described in Japanese Patent Application Laid-Open No. 11-258403).

The crosslinking or polymerization reaction for preparing such fluorine-containing polymer and/or siloxane polymer containing a crosslinkable or polymerizable group is preferably carried out by radiation of light or by heating simultaneously with or after applying a coating composition for forming an outermost layer, which contains a polymerization initiator, a sensitizing agent, etc.

A sol-gel cured film is also preferable which is obtained by curing the above coating composition by the condensation reaction carried out between an organic metal compound, such as silane coupling agent, and silane coupling agent containing a specific fluorine-containing hydrocarbon group in the presence of a catalyst.

Examples of such films include: those of polyfluoroalkyl-group-containing silane compounds or the partially hydrolyzed and condensed compounds thereof (compounds described in Japanese Patent Application Laid-Open Nos. 58-142958, 58-147483, 58-147484, 9-157582 and 11-106704); and silyl compounds that contain "perfluoroalkyl ether" group as a fluoline-containing long-chain group (compounds described in Japanese Patent Application Laid-Open Nos. 2000-117902, 2001-48590 and 2002-53804).

The low-refractive-index layer can contain additives other than the above described ones, such as filler (e.g. low-refractive-index inorganic compounds whose primary particles have an average particle size of 1 to 150 nm, such as silicon dioxide (silica) and fluorine-containing particles (magnesium fluoride, calcium fluoride, barium fluoride); organic fine particles described in Japanese Patent Application Laid-Open No. 11-3820, columns [0020] to [0038]), silane coupling agent, slippering agent and surfactant.

When located under the outermost layer, the low-refractive-index layer may be formed by vapor phase method (vacuum evaporation, spattering, ion plating, plasma CVD, etc.). From the viewpoint of reducing producing costs, coating method is preferable.

The thickness of the low-refractive-index layer is preferably 30 to 200 nm, more preferably 50 to 150 nm, and most preferably 60 to 120 nm.

[Hard Coat Layer]

A hard coat layer is provided on the surface of both stretched and unstretched cellulose acylate films so as to impart physical strength to the antireflection film. Particularly preferably the hard coat layer is provided between the stretched cellulose acylate film and the above described high-refractive-index layer and between the unstretched cellulose acylate film and the above described high-refractive-index layer. It is also preferable to provide the hard coat layer directly on the stretched and unstretched cellulose acylate films by coating without providing an antireflection layer.

Preferably, the hard coat layer is formed by the crosslinking reaction or polymerization of compounds curable by light and/or heat. Preferred curable functional groups are photopolymerizable functional groups, and organic metal compounds having a hydrolytic functional group are preferably organic alkoxy silyl compounds.

Specific examples of such compounds include the same compounds as illustrated in the description of the high-refractive-index layer.

Specific examples of compositions that constitute the hard coat layer include: those described in Japanese Patent Application Laid-Open Nos. 2002-144913, 2000-9908 and WO 0/46617.

The high-refractive-index layer can also serve as a hard coat layer. In this case, it is preferable to form the hard coat layer using the technique described in the description of the high-refractive-index layer so that fine particles are contained in the hard coat layer in the dispersed state.

The hard coat layer can also serves as an anti-glare layer (described later), if particles having an average particle size of 0.2 to 10 μm are added to provide the layer with the anti-glare function.

The thickness of the hard coat layer can be properly designed depending on the applications for which it is used. The thickness of the hard coat layer is preferably 0.2 to 10 μm and more preferably 0.5 to 7 μm.

The strength of the hard coat layer is preferably H or higher, by pencil hardness test in accordance with JIS K5400, more preferably 2H or higher, and much more preferably 3H or higher. The hard coat layer having a smaller abrasion loss in test, before and after Taber abrasion test conducted in accordance with JIS K5400, is more preferable.

[Forward Scattering Layer]

A forward scattering layer is provided so that it provides, when applied to liquid crystal displays, the effect of improving viewing angle when the angle of vision is tilted up-, down-, right- or leftward. The above described hard coat layer can also serve as a forward scattering layer, if fine particles with different refractive index are dispersed in it.

Example of such layers include: those described in Japanese Patent Application Laid-Open No. 11-38208 where the coefficient of forward scattering is specified; those described in Japanese Patent Application Laid-Open No. 2000-199809 where the relative refractive index of transparent resin and fine particles are allowed to fall in the specified range; and those described in Japanese Patent Application Laid-Open No. 2002-107512 wherein the haze value is specified to 40% or higher.

[Other Layers]

Besides the above described layers, a primer layer, antistatic layer, undercoat layer or protective layer may be provided.

[Coating Method]

The layers of the antireflection film can be formed by any method of dip coating, air knife coating, curtain coating, roller coating, wire bar coating, gravure coating, microgravure coating and extrusion coating (U.S. Pat. No. 2,681,294).

[Anti-Glare Function]

The antireflection film may have the anti-glare function that scatters external light. The anti-glare function can be obtained by forming irregularities on the surface of the antireflection film. When the antireflection film has the anti-glare function, the haze of the antireflection film is preferably 3 to 30%, more preferably 5 to 20%, and most preferably 7 to 20%.

As a method for forming irregularities on the surface of antireflection film, any method can be employed, as long as it can maintain the surface geometry of the film. Such methods include: for example, a method in which fine particles are used in the low-refractive-index layer to form irregularities on the surface of the film (e.g. Japanese Patent Application Laid-Open No. 2000-271878); a method in which a small amount (0.1 to 50% by mass) of particles having a relatively large size (0.05 to 2 μm in particle size) are added to the layer under a low-refractive-index layer (high-refractive-index layer, intermediate-refractive-index layer or hard coat layer) to form a film having irregularities on the surface and a low-refractive-index layer is formed on the irregular surface while keeping the geometry (e.g. Japanese Patent Application Laid-Open Nos. 2000-281410, 2000-95893, 2001-100004, 2001-281407); a method in which irregularities are physically transferred on the surface of the outermost layer (stainproofing layer) having been provided (e.g. embossing described in Japanese Patent Application Laid-Open Nos. 63-278839, 11-183710, 2000-275401).

[Applications]

The unstretched and stretched cellulose acylate films of the present invention are useful as optical films, particularly as polarizer protective film, optical compensation sheet (also referred to as retardation film) for liquid crystal displays, optical compensation sheet for reflection-type liquid crystal displays, and substrate for silver halide photographic photosensitive materials.

In the following the measurement methods used in the present invention will be described.

(1) Dimensional Change Under Wet Heating ($\delta L(w)$)

1). A sample film is cut in the directions of MD and TD and conditioned in an atmosphere of 25° C. and 60% rh for 5 hours and more, and then measured for the length by use of a pin gauge of a 20 cm base length (wherein the measured values are referred to as MD(F) and TD(F), respectively).

2). The cut and conditioned samples are left standing with no tension in a temperature and humidity controlled oven at 60° C. and 90% rh for 500 hours (this treatment is referred to as "thermo-treatment").

3). The samples after the "thermo treatment" are removed from the temperature and humidity controlled oven, conditioned in an atmosphere of 25° C. and 60% rh for 5 hours and more, and then measured for the length by use of a pin gauge of a 20 cm base length (wherein the measured values are referred to as MD(t) and TD(t), respectively).

4). The dimensional changes under wet heating ($\delta MD(w)$ and $\delta TD(w)$) in the MD and the TD direction, respectively, are determined according to the following formulas, and a larger value thereof is referred to as the dimensional change under wet heating ($\delta L(w)$).

$$\delta TD(w)(\%)=100\times|TD(F)-TD(t)|/TD(F)$$

$$\delta MD(w)(\%)=100\times|MD(F)-MD(t)|/MD(F)$$

(2) Dimensional Change Under Dry Heating ($\delta L(d)$)

The dimensional change under dry heating ($\delta L(d)$) is determined in the same manner as described in the above dimensional change under wet heating ($\delta L(w)$) except that the "thermo-treatment" is changed to a dry atmosphere at 80° C. for 500 hours.

(3) Re and Rth

A sample film, which is conditioned at 25° C. and 60% rh for 5 hours or more, is measured at the same temperature and humidity for retardation values by use of an automatic birefringence analyzer (KOBRA-21ADH: manufactured by Oji Scientific Instruments) to the light having a wavelength of 550 nm incident upon the surface of the film sample in the vertical direction thereof and in the direction ±40° inclined from the normal to the film plane. In-plane retardation (Re) is calculated from the measured value for the light in the vertical direction, and retardation in the thickness direction (Rth) is calculated from the measured value for the light in the direction ±40° inclined from the normal to the film plane. These are referred to as Re and Rth.

(4) Change of Re and Rth Under Wet Heating

1). A sample film is conditioned at 25° C. and 60% rh for 5 hours or more, and then measured for Re and Rth by the method as described above (wherein the measured values are referred to as Re(f) and Rth(f), respectively).

2). The sample is left standing with no tension in a temperature and humidity controlled oven at 60° C. and 90% rh for 500 hours (thermo treatment).

3). The sample after the thermo treatment is removed from the temperature and humidity controlled oven, conditioned in an atmosphere of 25° C. and 60% rh for 5 hours and more, and then measured for the Re and Rth in the manner as described above (wherein the measured values are referred to as Re(t) and Rth(t), respectively).

4). Change of Re and Rth under wet heating is determined by the following formulas.

$$\text{Change of Re under wet heating }(\%)=100\times(\text{Re}(f)-\text{Re}(t))/\text{Re}(f)$$

$$\text{Change of Rth under wet heating }(\%)=100\times(\text{Rth}(f)-\text{Rth}(t))/\text{Rth}(f)$$

(5) Change of Re and Rth Under Dry Heating

The change of Re and Rth under dry heating is determined in the same manner as described in the above change of Re and Rth under wet heating except that the thermo-treatment is changed to a dry atmosphere at 80° C. for 500 hours.

(6) Fine Retardation Unevenness

A sample film is conditioned in an atmosphere of 25° C. and 60% rh for 5 hours and more, and then is measured for Re at 10 points while being shifted by 0.1 mm in the MD direction by use of an ellipsometer (automatic birefringence evaluation system manufactured by UNIOPT Corporation, Ltd.). The difference between the maximum value and the minimum value divided by the average value of the 10 points (fine retardation unevenness in the MD direction) is calculated. Fine retardation unevenness in the TD direction is also calculated by measuring the sample film while shifting it by 0.1 mm in the TD direction.

The larger one of the fine retardation unevenness in the MD direction and the fine retardation unevenness in the TD direction is defined as the fine retardation unevenness.

(7) Length-to-Width Ratio

The length-to-width ratio is defined as a value (L/W) obtained by dividing the nip roll spacing used for stretching (L: the distance between the cores of two pairs of nip rolls) by the width of a cellulose acylate resin film before stretching (W). When there are three pairs of nip rolls or more, a larger L/W value is defined as the length-to-width ratio.

(8) The Percentage of Relaxation

The percentage of relaxation is defined as a value obtained by dividing the relaxation length by the dimension of a film before stretching and expressing the result in percentage.

(9) The Substitution Degree of Cellulose Acylate

The degree of acyl substitution of cellulose acylate was determined by 13C-NMR according to the method described in Carbohydr. Res. 273 (1995) 83-91 (Tezuka et al.).

The features of the present invention will be more specifically described below according to the examples and comparative examples. Materials, used amount, percentage, contents of treatment, treatment procedures and the like illustrated in the following examples can be appropriately modified as long as they do not depart from the spirit of the present invention. Therefore, the specific examples as illustrated below should not be construed to limit the scope of the present invention.

EXAMPLES

In Examples 1 to 4, cellulose resin having a number average molecular weight of 20,000 (CAP 482-2, produced by Daicel Chemical Industries, Ltd.) was used for the outer layers and cellulose resin having a number average molecular weight of 100,000 (CAB 381-2, produced by Daicel Chemical Industries, Ltd.) for the inner layer. In Comparative Examples 1 and 2, cellulose resin having a number average molecular weight of 80,000 (CAB 381-20, produced by Daicel Chemical Industries, Ltd.) was used for the outer layers and cellulose resin having a number average molecular weight of 100,000 (CAB 381-2, produced by Daicel Chemical Industries, Ltd.) for the inner layer. The above described cellulose resin were formed into a film 100 μm thick (two-component and three-layer, each of the upper and lower outer layers: 10 μm thick, the inner layer: 80 μm thick) with a single-screw extruder (produced by Toshiba Machine, screw diameter: φ 50 mm) at an extrusion temperature of 240° C.

In Examples 1 and 4 and Comparative Example 2, a three-layer multi-manifold die, produced by EDI, was used and as resistance elements, inner bars fitted in the die were used. The length of the lip land was 100 mm for Example 1 and Comparative Example 2, while it was 3 mm for Example 4.

In Examples 2 and 3 and Comparative Example 1, a single-layer die and a feed block, both produced by Toshiba Machine, were used and the length of the lip land was 100 mm. In Example 1 and Comparative Example 1, the inner bars fitted in the die were used as resistance elements.

Evaluation of the resultant films for their die lines was made based on the measurements of the surface roughness of the films, because the occurrence of die lines results in the irregularities on the film surface. The surface roughness was measured with a three-dimensional surface roughness tester produced by Tokyo Seimitsu under the conditions: Ra (center-line average surface roughness) for 50 mm length, cut off of 0.8 mm. The mid portion of a film herein used means the entire portion of the film except the edge portion that is affected by the unstable flow of the molten resin.

As is apparent from Table of FIG. 6, in Examples 1 to 4, the surface roughness (Ra) in the mid portion of the films was small, indicating that the occurrence of die lines could be prevented, because in the method for producing a three-layer cellulose resin film including the steps of: discharging two cellulose resin molten in the respective extruders in the form of a sheet from a die upon a cooling support by co-extrusion; and cooling and solidifying the sheet-shaped molten resin into a film, were satisfied the following conditions: the cellulose resin forming the inner layer has a number average molecular weight larger than that of the cellulose resin forming the outer layers; and the number average molecular weight of the cellulose resin forming the inner layer is 30,000 or more and 100,000 or less, while the number average molecular weight of the cellulose resin forming the outer layer is 20,000 or more and 50,000 or less. In contrast, in Comparative Examples 1 and 2, the condition that the number average molecular weight of the cellulose resin forming the outer layer is 20,000 or more and 50,000 or less was not satisfied, and thus, the surface roughness (Ra) in the mid portion of the film was large, indicating that die lines occurred in the film. Further, in Examples 2 and 3, resistance elements (inner bars) were used to increase the expansion of the outer layers, whereby the proportion of the cellulose resin film usable was increased. Further, in Examples 1 and 4, the length of the lip land of the die was 5 mm or more and 150 mm or less, which produced a smoothing effect, whereby the surface roughness of the cellulose resin film could be reduced. Particularly in Example 1, the surface roughness was small even on the edge portion of the film, which indicates that the use of a multi-manifold die could suppress the interminglement of the two cellulose resin different in number average molecular weight (viscosity).

Two-component and two-layer films having a thickness of 100 μm (thickness of outer layer: 20 μm, thickness of inner layer: 80 μm) were also prepared using cellulose resin having a number average molecular weight of 20,000 (CAP 482-2, produced by Daicel Chemical Industries, Ltd.) for the outer layers and cellulose resin having a number average molecular weight of 100,000 (CAB 381-2, produced by Daicel Chemical Industries, Ltd.) for the inner layer. And the films were evaluated in the same manner as above. The evaluations were the same as above.

[Preparation of Polarizing Plate]

(1) Surface Treatment

The stretched cellulose acylate resin films of the present invention were saponified according to any one of the following methods of coating saponification.

(a) Coating Saponification

To 80 parts by weight of iso-propanol, was added 20 parts by weight of water to obtain a solution, in which KOH was dissolved so that a 1.5 N solution of KOH was prepared. The resulting solution was warmed to 60° C., and it was used as a saponification solution. The saponification solution was coated on the cellulose acylate resin films of 60° C. in an amount of 10 g/m² to saponify the films for one minute. Subsequently, hot water of 50° C. was used to clean the resulting films by spraying it for one minute at a flow rate of 10 l/m²·min.

(b) Saponification by Immersion

As a saponifying solution, 1.5 N aqueous solution of NaOH was used. The temperature of the solution was adjusted to 60° C., and a cellulose resin film was immersed in the solution for 2 minutes. Then, the cellulose resin film was immersed in 0.1 N aqueous solution of sulfuric acid for 30 seconds and passes through a rinsing bath.

(2) Preparation of Polarizing Layer

Polarizing layer 20 μm thick were prepared in accordance with Example 1 described in Japanese Patent Application Laid-Open No. 2001-141926, where stretching was performed in the longitudinal direction by creating a difference in circumferential velocity between 2 pairs of nip rolls. The polarizing layers prepared were one prepared immediately after film formation, one prepared immediately after stretching, and one prepared after allowing the saponified cellulose resin film to stand at 80° C. for 1 month. Polarizing layers were also prepared, like in Example 1 described in Japanese Patent Application Laid-Open No. 2002-86554, where stretching was performed so that the stretching axis was tilted 45°. The evaluations were the same as above.

(3) Lamination

The polarizing layer prepared using the film immediately after stretching (fresh product) and the polarizing layer prepared using the film which was left stand at 80° C. for 1 month after stretching (over-time product) were inserted between the above described saponified stretched cellulose resin film (retardation sheet) and a saponified protective film for sheet polarizer (trade name: Fujitack). The lamination of the polarizing layer and the retardation sheet was performed using 3% aqueous solution of PVA (PVA-117H produced by Kuraray Co., Ltd.) as an adhesive, when the retardation sheet was made of cellulose resin, or using an epoxy adhesive, when the retardation sheet was made of a material other than cellulose resin. The lamination of Fujitack and the polarizing layer was performed using the above described PVA aqueous solution as an adhesive. The lamination was performed so that the angle between the polarization axis and the longitudinal direction of the retardation sheet was 45 degrees. The sheets of polarizer thus obtained were installed in the respective 20-inch VA-mode liquid crystal displays of FIGS. 2 to 9 described in Japanese Patent Application Laid-Open No. 2000-154261 in such a manner that the retardation sheet faced the liquid crystal, while the Fujitack faced outside (viewers). The liquid crystal displays were evaluated visually for the proportion of discolored area accounting for of the entire area, while comparing the one using the sheet polarizer as a fresh product and one using the sheet polarizer as an over-time product. The liquid crystal displays in which the sheet polarizer of the present invention was installed had good performance.

[Preparation of Optical Compensation Film]

Optical compensation films were prepared in the same manner as in Example 1 described in Japanese Patent Application Laid-Open No. 11-316378, provided that the stretched cellulose resin films of the present invention were used instead of the cellulose acylate film with its surface coated with a liquid crystal layer. In the preparation, the film immediately after stretching (fresh product) and the film which was left stand at 80° C. for 1 month after stretching (over-time product) were used. The resultant optical compensation films were evaluated visually for the proportion of discolored area accounting for of the entire area, while comparing the one using the sheet polarizer as a fresh product and one using the sheet polarizer as an over-time product. The optical compensation films in which the cellulose resin film of the present invention was used had good performance.

The cellulose acetate film, on which the liquid crystal layer in Example 1 of Japanese Patent Laid-Open No. 7-333433 is coated, was replaced by the stretched cellulose acylate resin film of the present invention to prepare an optical compensation filter film. In this case also, it was possible to produce good optical compensation films.

On the other hand, in the optical compensation films prepared using a cellulose resin film other than that of the present invention, the deterioration of the optical characteristics was observed. Particularly in the optical compensation films prepared in accordance with Example 1 described in Japanese Patent Application Laid-Open No. 2002-31240, the deterioration of the optical characteristics was significant.

[Preparation of Low Reflection Film]

The stretched cellulose acylate resin film of the present invention was used to prepare a low reflection film according to Example 47 in the Journal of Technical Disclosure published by the Japan Institute of Invention and Innovation (Technical Disclosure No. 2001-1745). The film provided good optical performance.

[Preparation of Liquid Crystal Display Element]

The polarizing plate of the present invention as described above was used for the liquid crystal display device described in Example 1 of Japanese Patent Laid-Open No. 10-48420, the optical anisotropy layer containing a discotic liquid crystal molecule described in Example 1 of Japanese Patent Laid-Open No. 9-26572, an oriented film coated with polyvinyl alcohol, the 20 inch VA-type liquid crystal display device illustrated in FIGS. 2 to 9 of Japanese Patent Laid-Open No. 2000-154261, the 20 inch OCB-type liquid crystal display device illustrated in FIGS. 10 to 15 of Japanese Patent Laid-Open No. 2000-154261, and the IPS-type liquid crystal display device illustrated in FIG. 11 of Japanese Patent Laid-Open No. 2004-12731. Moreover, the low reflection films of the present invention were applied to the top layer of these liquid crystal devices for evaluation, and good liquid crystal elements were obtained.

The invention claimed is:

1. A method for producing a cellulose resin film, comprising the steps of:
    discharging two cellulose resins A and B molten in respective extruders in the form of an A/B/A three-layer sheet from a die upon a support by co-extrusion; and
    cooling and solidifying the sheet-shaped molten resin into a film, wherein
    the resin A, which forms a pair of outer layers of the A/B/A three-layer sheet, has a number average molecular weight smaller than that of the resin B, which forms the inner layer of the A/B/A three-layer sheet, and
    the resin A has a number average molecular weight of 20,000 or more and 50,000 or less, and the resin B has a number average molecular weight of 30,000 or more and 100,000 or less, wherein
    the produced cellulose resin film has a surface roughness (Ra) of 0.03 μm or less in the mid portion thereof.

2. The method for producing a cellulose resin film according to claim 1, wherein the cellulose resin forming the outer layer(s) has a thickness of 20% or less of the overall thickness of the film.

3. The method for producing a cellulose resin film according to claim 1, wherein the outer layer(s) have a width of 99% or more of the overall width of the film.

4. The method for producing a cellulose resin film according to claim 1, wherein the die is a multi-manifold die.

5. The method for producing a cellulose resin film according to claim 1, wherein the die has a lip land with a length of 5 mm or more and 150 mm or less.

6. A method for producing a cellulose resin film, comprising the steps of:
    discharging two cellulose resins A and B molten in respective extruders in the form of an A/B two-layer sheet from a die upon a support by co-extrusion; and
    cooling and solidifying the sheet-shaped molten resin into a film, wherein
    the resin A, which forms the outer layer of the A/B two-layer sheet not in contact with the support, has a number average molecular weight smaller than that of the resin B, which forms the inner layer of the A/B two-layer sheet in contact with the support, and
    the resin A has a number average molecular weight of 20,000 or more and 50,000 or less, and the resin B has a number average molecular weight of 30,000 or more and 100,000 or less, wherein
    the produced cellulose resin film has a surface roughness (Ra) of 0.03 μm or less in the mid portion thereof.

7. The method for producing a cellulose resin film according to claim 6, wherein the cellulose resin forming the outer layer(s) has a thickness of 20% or less of the overall thickness of the film.

8. The method for producing a cellulose resin film according to claim 6, wherein the outer layer(s) have a width of 99% or more of the overall width of the film.

9. The method for producing a cellulose resin film according to claim 8, wherein the cellulose resin forming the outer layer(s) is expanded in the widthwise direction by adjusting the width of a manifold of the die with movable resistance elements provided on both ends of the manifold.

10. The method for producing a cellulose resin film according to claim 6, wherein the die is a multi-manifold die.

11. The method for producing a cellulose resin film according to claim 6, wherein the die has a lip land with a length of 5 mm or more and 150 mm or less.

12. The method for producing a cellulose resin film, according to claim 1, wherein
    a cylinder of each of the extruders has an L/D of 20 to 70, the L/D indicating a ratio of a length (L) to an inside diameter (D) of the cylinder.

13. The method for producing a cellulose resin film, according to claim 6, wherein
    a cylinder of each of the extruders has an L/D of 20 to 70, the L/D indicating a ratio of a length (L) to an inside diameter (D) of the cylinder.

* * * * *